United States Patent
Sakai et al.

[11] Patent Number: 6,066,415
[45] Date of Patent: May 23, 2000

[54] HYDROGEN ABSORBING ELECTRODE AND METAL OXIDE-HYDROGEN SECONDARY BATTERY

[75] Inventors: Isao Sakai; Hideki Yoshida, both of Yokohama; Masaaki Yamamoto, Inzai; Motoya Kanda, Yokohama, all of Japan

[73] Assignee: Kabushiki Kaisha Toshiba, Kawasaki, Japan

[21] Appl. No.: 08/928,033

[22] Filed: Sep. 11, 1997

[30] Foreign Application Priority Data

Sep. 12, 1996 [JP] Japan ................................... 8-241897
Mar. 18, 1997 [JP] Japan ................................... 9-064932

[51] Int. Cl.$^7$ ................................ H01M 4/38; C01B 6/24
[52] U.S. Cl. ........................ 429/218.2; 429/223; 420/900
[58] Field of Search ................................ 429/218.2, 223; 420/900

[56] References Cited

U.S. PATENT DOCUMENTS

| | | |
|---|---|---|
| 4,215,008 | 7/1980 | Hagiwara et al. . |
| 4,375,257 | 3/1983 | Bruning et al. . |
| 5,290,509 | 3/1994 | Furukawa et al. ........................ 420/435 |
| 5,304,345 | 4/1994 | Fujitani et al. ............................ 420/55 |
| 5,496,424 | 3/1996 | Fujitani et al. ........................ 148/555 |
| 5,817,222 | 10/1998 | Kaneko .................... 204/293 |
| 5,840,166 | 11/1998 | Kaneko .................... 204/293 |
| 5,858,571 | 1/1999 | Ishii et al. ................................. 429/59 |

FOREIGN PATENT DOCUMENTS

| | | |
|---|---|---|
| 61-277162 | 12/1986 | Japan . |
| 62-119864 | 6/1987 | Japan . |
| 64-60961 | 3/1989 | Japan . |
| 3-223408 | 10/1991 | Japan . |
| 5-166505 | 7/1993 | Japan . |
| 8-236147 | 9/1996 | Japan . |

OTHER PUBLICATIONS

Hiroshi Miyamura, et al., "Characteristics of Electrodes Using Amorphous $AB_2$ Hydrogen Storage Alloys", Journal of the Less–Common Metals, 172–174 (1991), pp. 1205–1210 (month N/A).

Yan LI, et al., "Amorphous La–Ni Thin Film Electrodes", Journal of Alloys and Compounds 223 (1995), pp. 6–12 (month N/A).

O.A. Petrii, et al., "Investigation of Materials Based on Intermetallic Compounds of the $CeNi_3$–$CeCo_3$ System and a Polymeric Binding Material", Journal of the Less–Common Metals, 136 (1987)pp. 121–134 (month N/A).

*Primary Examiner*—Maria Nuzzolillo
*Assistant Examiner*—Jonathan Crepeau
*Attorney, Agent, or Firm*—Oblon, Spivak, McClelland, Maier & Neustadt, P.C.

[57] ABSTRACT

A hydrogen absorbing electrode containing a hydrogen absorbing alloy consisting mainly of $AB_3$ type crystal-structure phase and represented by the following formula (I) is provided $$R(Ni_{1-x}M_x)_z \qquad (I)$$

wherein R is at least one element selected from rare earth elements (including Y), M is at least one element selected from the group consisting of Al, Ga, Zn, Sn, Cu, Si, Ag, In, Ti, Zr, Hf, V, Nb, Ta, Cr, Fe, Mn, Mo and W, and x and z are respectively a number satisfying conditions $0.01 \leq x \leq 0.2$, and $2.5 < z < 3.25$.

25 Claims, 1 Drawing Sheet

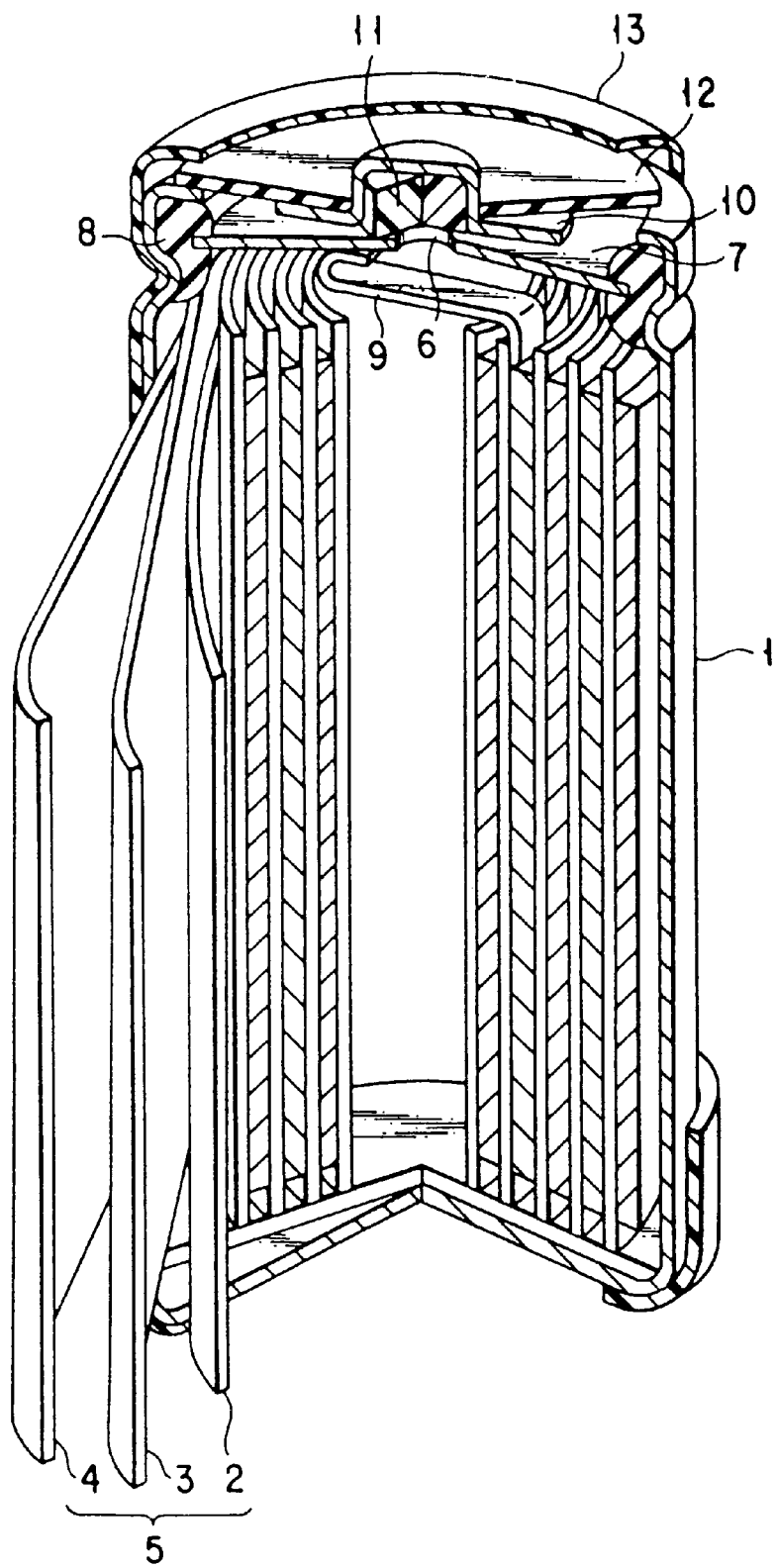
FIGURE

HYDROGEN ABSORBING ELECTRODE AND METAL OXIDE-HYDROGEN SECONDARY BATTERY

BACKGROUND OF THE INVENTION

This invention relates to a hydrogen absorbing electrode and a metal oxide-hydrogen secondary battery provided with the hydrogen absorbing electrode as a negative electrode.

Recently, a hydrogen absorbing alloy which is capable of reversibly absorbing and desorbing hydrogen for use as an energy source is extensively applied to the negative electrode of a nickel-metal hydride secondary battery.

A rare earth elements-based hydrogen absorbing alloy having an $AB_5$ type crystalline structure; a titanium-based hydrogen absorbing alloy having an AB type or $AB_2$ type crystalline structure; and a zirconium-based hydrogen absorbing alloy (Laves phase alloy) having an $AB_2$ type crystalline structure are all capable of reacting with hydrogen at the room temperature, and relatively excellent in chemical stability so that they are now extensively studied as useful for an electrode material of a secondary battery. In particular, a metal oxide-hydrogen secondary battery, e.g. nickel-hydride secondary battery, which is provided with a hydrogen absorbing electrode (negative electrode) containing an $AB_5$ type hydrogen absorbing alloy exhibits a discharge capacity of as high as 80% or more of the theoretical discharge capacity, so that any further increase of the discharge capacity may not be expected.

On the other hand, a rare earth element-nickel intermetallic compound takes many other crystal structures in addition to the $AB_5$ type structure. For example, it is reported that an intermetallic compound containing a larger quantity of a rare earth element than that in the $AB_5$ type intermetallic compound is capable of absorbing a larger amount of hydrogen as compared with the $AB_5$ type intermetallic compound at the room temperature (for example, Mat. Res. Bull., 11, (1976) 1241). However, it is also reported that since the aforementioned rare earth element-nickel intermetallic compound tends to retain hydrogen too stably, the hydrogen thus absorbed by the rare earth element-nickel intermetallic compound can be hardly released or desorbed therefrom. For example, it is reported in J. Less-Common Metals, 136 (1987) 121 that when a $CeNi_3$—$CeCo_3$ alloy was allowed to undergo a charge/discharge in a 1M KOH electrolyte, a capacity of about 700Q/g was obtained in the charging process, but a phenomenon of $CeNi_{3-x}Co_xH_3 \rightarrow CeNi_{3-x}Co_xH_1$ was recognized in the discharging process. Since an electrode containing this kind of rare earth element-nickel intermetallic compound is hardly capable of completely desorbing hydrogen at the occasion of discharging, no one has succeeded up to date to put this electrode into practical use as an electrode of a metal oxide-hydrogen secondary battery.

BRIEF SUMMARY OF THE INVENTION

Accordingly, an object of the present invention is to provide a hydrogen absorbing electrode containing a rare earth elements-Ni-based intermetallic compound comprising an $AB_3$ type crystal structure as a main phase and containing a larger quantity of rare earth element than that of the $AB_5$ type crystal structure, which is free from a problem of difficulty in desorbing hydrogen and hence is capable of exhibiting a large discharge capacity.

Another object of this invention is to provide a hydrogen absorbing electrode containing an inter-metallic compound comprising a larger quantity of rare earth element than that of the $AB_5$ type crystal structure, specifically a rare earth elements-Ni-based intermetallic compound having an AB type crystal-structure or $AB_2$ type crystal-structure, which is free from a problem of difficulty in desorbing hydrogen and hence is capable of exhibiting a large discharge capacity.

Another object of this invention is to provide a metal oxide-hydrogen secondary battery which is high in capacity and excellent in charge/discharge cycle characteristics.

Namely, according to the present invention, there is provided a hydrogen absorbing electrode containing a hydrogen absorbing alloy consisting mainly of $AB_3$ type crystal-structure phase and represented by the following formula (I):

$$R(Ni_{1-x}M_x)_z \qquad (I)$$

wherein R is at least one element selected from rare earth elements (including Y); M is at least one element selected from the group consisting of Al, Ga, Zn, Sn, Cu, Si, Ag, In, Ti, Zr, Hf, V, Nb, Ta, Cr, Fe, Mn, Mo and W; and x and z are respectively a number satisfying conditions: $0.01 \leq x \leq 0.2$, and $2.5 < z < 3.25$.

According to the present invention, there is further provided a hydrogen absorbing electrode containing a hydrogen absorbing alloy consisting mainly of $AB_3$ type crystal-structure phase and represented by the following formula (II):

$$R(Ni_{1-x-y}M1_xM2_y)_z \qquad (II)$$

wherein R is at least one element selected from rare earth elements (including Y); M1 is at least one element selected from the group consisting of Co, Mn and Fe; M2 is at least one element selected from the group consisting of Al, Ga, Zn, Sn, Cu, Si, Ag, In, Ti, Zr, Hf, V, Nb, Ta, Cr, Mo and W; and x, y and z are respectively a number satisfying conditions: $0.01 \leq x \leq 0.5$, $0.01 \leq y \leq 0.2$, and $2.5 < z < 3.25$.

Further, according to the present invention, there is provided a hydrogen absorbing electrode containing a hydrogen absorbing alloy consisting mainly of $AB_3$ type crystal-structure phase and represented by the following formula (III):

$$R1_{1-a}R2_a(Ni_{1-x}M_x)_z \qquad (III)$$

wherein R1 is at least one element selected from the group consisting of La, Ce, Pr and Nd; R2 is at least one element selected from the group consisting of Y, Er, Sm, Gd, Tb, Dy, Ho, Zr, Hf and Ti; M is at least one element selected from the group consisting of Al, Ga, Zn, Cu, Si, Sn, Ag, In, V, Nb and Cr; and a, x and z are respectively a number satisfying conditions: $0.01 \leq a \leq 0.50$, $0.01 \leq x \leq 0.2$, and $2.5 < z < 3.25$.

Further, according to the present invention, there is provided a hydrogen absorbing electrode containing a hydrogen absorbing alloy consisting mainly of $AB_3$ type crystal-structure phase and represented by the following formula (IV):

$$R1_{1-a}R2_a(Ni_{1-x-y}M1_xM2_y)_z \qquad (IV)$$

wherein R1 is at least one element selected from the group consisting of La, Ce, Pr and Nd; R2 is at least one element selected from the group consisting of Y, Er, Sm, Gd, Tb, Dy, Ho, Zr, Hf and Ti; M1 is at least one element selected from the group consisting of Co, Mn and Fe; M2 is at least one element selected from the group consisting of Al, Ga, Zn, Cu, Si, Sn, Ag, In, V, Nb and Cr; and a, x, y and z are respectively a number satisfying conditions: $0.01 \leq a \leq 0.50$, $0.01 \leq x \leq 0.5$, $0.01 \leq y \leq 0.2$, and $2.5 < z < 3.25$.

Further, according to the present invention, there is also provided a hydrogen absorbing electrode containing a hydrogen absorbing alloy consisting mainly of at least one phase selected from the first group consisting of a $CaCu_5$ type crystal-structure phase, a $Ce_2Ni_7$ type crystal-structure phase and a $Gd_2Co_7$ type crystal-structure phase, and at least one phase selected from the second group consisting of a CrB type crystal-structure phase, a FeB type crystal-structure phase, an $AlB_2$ type crystal-structure phase, a $CeCu_2$ type crystal-structure, a $Ni_2In$ type crystal-structure phase, a $CaIn_2$ type crystal-structure phase, a $Fe_2P$ type crystal-structure phase and a $ThSi_2$ type crystal-structure phase; a ratio of a strongest peak Iy of the second group to a strongest peak Ix of the first group (Iy/Ix) in an X-ray diffraction by Cu-Kα ray being in a range of 0.01 to 10; and the hydrogen absorbing alloy being represented by the following formula (V):

$$R(Ni_{1-d}T_d)_z \qquad (V)$$

wherein R is at least one element selected from the group consisting of rare earth elements, Y, Zr, Hf and Ti; T is at least one element selected from the group consisting of Co, Fe, Cu, Mn, Al, Si, B, Sn, Ga, Ge, Zn and Ag; and d and z are respectively a number satisfying conditions: $d \leq 0.9$, and $1.5 \leq z \leq 4$.

According to the present invention, there is further provided a metal oxide-hydrogen secondary battery comprising a positive electrode containing a metal oxide, a negative electrode and an alkali electrolyte; the secondary battery being featured in that the negative electrode contains a hydrogen absorbing alloy consisting mainly of $AB_3$ type crystal-structure phase and represented by the following general formula (I):

$$R(Ni_{1-x}M_x)_z \qquad (I)$$

wherein R is at least one element selected from rare earth elements (including Y); M is at least one element selected from the group consisting of Al, Ga, Zn, Sn, Cu, Si, Ag, In, Ti, Zr, Hf, V, Nb, Ta, Cr, Fe, Mn, Mo and W; and x and z are respectively a number satisfying conditions: $0.01 \leq x \leq 0.2$, and $2.5 < z < 3.25$.

According to the present invention, there is further provided a metal oxide-hydrogen secondary battery comprising a positive electrode containing a metal oxide, a negative electrode and an alkali electrolyte; the secondary battery being featured in that the negative electrode contains a hydrogen absorbing alloy consisting mainly of $AB_3$ type crystal-structure phase and represented by the following formula (II):

$$R(Ni_{1-x-y}M1_xM2_y)_z \qquad (II)$$

wherein R is at least one element selected from rare earth elements (including Y); M1 is at least one element selected from the group consisting of Co, Mn and Fe; M2 is at least one element selected from the group consisting of Al, Ga, Zn, Sn, Cu, Si, Ag, In, Ti, Zr, Hf, V, Nb, Ta, Cr, Mo and W; and x, y and z are respectively a number satisfying conditions: $0.01 \leq x \leq 0.5$, $0.01 \leq y \leq 0.2$, and $2.5 < z < 3.25$.

According to the present invention, there is further provided a metal oxide-hydrogen secondary battery comprising a positive electrode containing a metal oxide, a negative electrode and an alkali electrolyte; the secondary battery being featured in that the negative electrode contains a hydrogen absorbing alloy consisting mainly of $AB_3$ type crystal-structure phase and represented by the following formula (III):

$$R1_{1-a}R2_a(Ni_{1-x}M_x)_z \qquad (III)$$

wherein R1 is at least one element selected from the group consisting of La, Ce, Pr and Nd; R2 is at least one element selected from the group consisting of Y, Er, Sm, Gd, Tb, Dy, Ho, Zr, Hf and Ti; M is at least one element selected from the group consisting of Al, Ga, Zn, Cu, Si, Sn, Ag, In, V, Nb and Cr; and a, x and z are respectively a number satisfying conditions: $0.01 \leq a \leq 0.50$, $0.01 x \leq 0.2$, and $2.5 < z < 3.25$.

According to the present invention, there is further provided a metal oxide-hydrogen secondary battery comprising a positive electrode containing a metal oxide, a negative electrode and an alkali electrolyte; the secondary battery being featured in that the negative electrode contains a hydrogen absorbing alloy consisting mainly of $AB_3$ type crystal-structure phase and represented by the following formula (IV):

$$R1_{1-a}R2_a(Ni_{1-x-y}M1_xM2_y)_z \qquad (IV)$$

wherein R1 is at least one element selected from the group consisting of La, Ce, Pr and Nd; R2 is at least one element selected from the group consisting of Y, Er, Sm, Gd, Dy, Tb, Dy, Ho, Zr, Hf and Ti; M1 is at least one element selected from the group consisting of Co, Mn and Fe; M2 is at least one element selected from the group consisting of Al, Ga, Zn, Cu, Si, Sn, Ag, In, V, Nb and Cr; and a, x, y and z are respectively a number satisfying conditions: $0.01 \leq a \leq 0.50$, $0.01 \leq x \leq 0.5$, $0.01 \leq y \leq 0.2$, and $2.5 < z < 3.25$.

According to the present invention, there is further provided a metal oxide-hydrogen secondary battery comprising a positive electrode containing a metal oxide, a negative electrode and an alkali electrolyte; the secondary battery being featured in that the negative electrode contains a hydrogen absorbing alloy consisting mainly of at least one phase selected from the first group consisting of a $CaCu_5$ type crystal-structure phase, a $Ce_2Ni_7$ type crystal-structure phase and a $Gd_2Co_7$ type crystal-structure phase, and at least one phase selected from the second group consisting of a CrB type crystal-structure phase, a FeB type crystal-structure phase, an $AlB_2$ type crystal-structure phase, a $CeCu_2$ type crystal-structure phase, a $Ni_2In$ type crystal-structure phase, a $CaIn_2$ type crystal-structure phase, a $Fe_2P$ type crystal-structure phase and a $ThSi_2$ type crystal-structure phase; a ratio of a strongest peak Iy of the second group to a strongest peak Ix of the first group (Iy/Ix) in an X-ray diffraction by Cu-Kα ray being in a range of 0.01 to 10; and the hydrogen absorbing alloy being represented by the following formula (V):

$$R(Ni_{1-d}T_d)_z \qquad (V)$$

wherein R is at least one element selected from the group consisting of rare earth elements, Y, Zr, Hf and Ti; T is at least one element selected from the group consisting of Co, Fe, Cu, Mn, Al, Si, B, Sn, Ga, Ge, Zn and Ag; and d and z are respectively a number satisfying conditions: $d \leq 0.9$, and $1.5 \leq z \leq 4$.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

The FIGURE is a partially sectioned perspective view showing one embodiment of a metal oxide-hydrogen secondary battery of this invention.

DETAILED DESCRIPTION OF THE INVENTION

This invention will be explained in details with reference to the following hydrogen absorbing electrodes (a) to (e).

Hydrogen Absorbing Electrodes (a):

This hydrogen absorbing electrode may be in the form of either (1) a pellet type which can be manufactured by mixing the powder of hydrogen absorbing alloy consisting mainly of $AB_3$ type crystal-structure phase and represented by the following formula (I) with conductive powder such as electrolytic copper, and by pressing the resultant mixture into the pellet; or (2) a paste type which can be manufactured by adding a conductive material to the powder of hydrogen absorbing alloy consisting mainly of $AB_3$ type crystal-structure phase and represented by the following formula (I), and by kneading the resultant mixture together with a polymer binder and water to form a paste, which is subsequently filled in a conductive substrate, dried and molded:

$$R(Ni_{1-x}M_x)_z \qquad (I)$$

wherein R is at least one element selected from rare earth elements (including Y); M is at least one element selected from the group consisting of Al, Ga, Zn, Sn, Cu, Si, Ag, In, Ti, Zr, Hf, V, Nb, Ta, Cr, Fe, Mn, Mo and W; and x and z are respectively a number satisfying conditions: $0.01 \leq x \leq 0.2$, and $2.5 < z < 3.25$.

Examples of the $AB_3$ type crystal structure are a $PuNi_3$ type crystal structure and a $CeNi_3$ type crystal structure. The aforementioned hydrogen absorbing alloy may have both $PuNi_3$ type and $CeNi_3$ type crystal structures.

The hydrogen absorbing alloy should preferably have the phase of $AB_3$ type crystal structure at a ratio (areal ratio) of 50% or more based on the hydrogen absorbing alloy. If the ratio of this phase is less than 50%, the discharge capacity of the electrode may be deteriorated, whereby shortening the charge/discharge life. More preferable areal ratio of this phase is 70% or more.

This hydrogen absorbing alloy may contain a phase of an $AB_5$ type crystal structure such as a $CaCu_5$ type crystal structure; a phase of an $AB_2$ type crystal structure such as an $AlB_2$ type, a $CeCu_2$ type, a $CaIn_2$ type or a $ThSi_2$ type crystal structure; or a phase of an $A_2B_7$ type crystal structure such as a $Ce_2Ni_7$ type or a $Gd_2Co_7$ type crystal structure.

Preferable examples of the M in the aforementioned formula (I) are Al, Ga, Zn, Sn, Cu, Si, Ag, In, Ti, Zr, Hf, V, Nb, Cr, Fe and Mn. More preferable examples of the M in the aforementioned formula (I) are Al, Ga, Zn, Sn, Cu, Si, Ti, Zr, Hf, V, Nb, Cr, Fe and Mn.

The reason for limiting the substitution ratio "x" of M in the aforementioned formula (I) is as follows. Namely, if this substitution ratio "x" is less than 0.01, it may become difficult to improve the desorption of hydrogen by the hydrogen absorbing alloy. On the other hand, if this substitution ratio "x" exceeds over 0.2, the crystal structure of the hydrogen absorbing alloy may be changed thus reducing the quantity of hydrogen absorption and resulting in a deterioration of discharge capacity of the hydrogen absorbing electrode containing this hydrogen absorbing alloy. A preferable range of the substitution ratio "x" is $0.01 \leq x \leq 0.18$.

The reason for limiting the ratio "z" between R and (Ni+M) in the aforementioned formula (I) is as follows. Namely, if this "z" is not more than 2.5 or not less than 3.25, the quantity of hydrogen absorption or hydrogen desorption of the alloy will be reduced, resulting in a deterioration of discharge capacity of the hydrogen absorbing electrode containing this hydrogen absorbing alloy. Moreover, if this "z" falls outside this limitation, it may become difficult to obtain a hydrogen absorbing alloy consisting mainly of $AB_3$ type crystal-structure phase. A preferable range of the ratio "z" is $2.7 \leq z \leq 3.2$.

The hydrogen absorbing alloy represented by the aforementioned formula (I) may contain unavoidable impurities, other than the aforementioned R, Ni and M, at a ratio of 1 wt % or less.

The hydrogen absorbing alloy represented by the aforementioned formula (I) can be manufactured by the following method for instance.

First of all, each element of R, Ni and M is weighed in a predetermined ratio and the resultant mixture is then subjected to an induction melting or an arc melting in an argon atmosphere thereby to obtain an alloy ingot having an aimed composition.

The alloy ingot thus obtained may be ultra-quenched by means of a melt-quenching method or a gas-atomizing method so as to enhance the uniformity of the alloy.

Furthermore, the alloy ingot obtained may be heat-treated at a temperature ranging from 300° C. to less than the melting point thereof for 0.1 to 500 hours in vacuum or in an inert gas atmosphere.

As for the conductive material to be employed for the paste type electrode, carbon black may be used.

Examples of the polymer binder to be employed for the paste type electrode are carboxymethyl cellulose, methyl cellulose, sodium polyacrylate and polytetrafluoroethylene.

The electroconductive substrate to be employed for the paste type electrode may be formed from a two-dimensional substrate such as a punched metal, an expanded metal and a nickel net; or from a three-dimensional substrate such as a felt-like metallic substrate and a sponge-like substrate.

Hydrogen Absorbing Electrodes (b):

This hydrogen absorbing electrode may be in the form of either (1) a pellet type which can be manufactured by mixing the powder of hydrogen absorbing alloy consisting mainly of $AB_3$ type crystal-structure phase and represented by the following formula (II) with conductive powder such as electrolytic copper, and by pressing the resultant mixture into the pellet; or (2) a paste type which can be manufactured by adding a conductive material to the powder of hydrogen absorbing alloy consisting mainly of $AB_3$ type crystal-structure phase and represented by the following formula (II), and by kneading the resultant mixture together with a polymer binder and water to form a paste, which is subsequently filled in a conductive substrate, dried and molded:

$$R(Ni_{1-x-y}M1_xM2_y)_z \qquad (II)$$

wherein R is at least one element selected from rare earth elements (including Y); M1 is at least one element selected from the group consisting of Co, Mn and Fe; M2 is at least one element selected from the group consisting of Al, Ga, Zn, Sn, Cu, Si, Ag, In, Ti, Zr, Hf, V, Nb, Ta, Cr, Mo and W; and x, y and z are respectively a number satisfying conditions: $0.01 \leq x \leq 0.5$, $0.01 \leq y \leq 0.2$, and $2.5 < z < 3.25$.

Examples of the $AB_3$ type crystal structure are the same as explained in the aforementioned hydrogen absorbing electrodes (a). This hydrogen absorbing alloy may have both $PuNi_3$ type and $CeNi_3$ type crystal structures.

Due to the same reasons as explained in the aforementioned hydrogen absorbing electrodes (a), the hydrogen absorbing alloy should preferably have the phase of $AB_3$ type crystal structure at a ratio (areal ratio) of 50% or more based on the hydrogen absorbing alloy. More preferable areal ratio of this phase is 70% or more.

This hydrogen absorbing alloy may contain a phase of an $AB_5$ type crystal structure, a phase of an $AB_2$ type crystal structure and a phase of an $A_2B_7$ type crystal structure.

One of the M1 in the aforementioned formula (II) should preferably be Co. Preferable examples of the M2 in the aforementioned formula (II) are Al, Ga, Zn, Sn, Cu, Si, Ag, In, Ti, Zr, Hf, V, Nb and Cr. More preferable examples of the M2 in the aforementioned formula (II) are Al, Ga, Zn, Sn, Cu, Si, Ti, Zr, Hf, V, Nb and Cr.

The reason for limiting the substitution ratio "x" of M1 in the aforementioned formula (II) is as follows. Namely, if this substitution ratio "x" is less than 0.01, it may become difficult to improve the desorption of hydrogen by the hydrogen absorbing alloy. On the other hand, if this substitution ratio "x" exceeds over 0.5, the crystal structure of the hydrogen absorbing alloy may be changed thus reducing the quantity of hydrogen absorption or hydrogen desorption, and resulting in a deterioration of discharge capacity of the hydrogen absorbing electrode containing this hydrogen absorbing alloy. A preferable range of the substitution ratio "x" is $0.05 \leq x \leq 0.4$.

The reason for limiting the substitution ratio "y" of M2 in the aforementioned formula (II) is as follows. Namely, if this substitution ratio "y" is less than 0.01, it may become difficult to improve the desorption of hydrogen by the hydrogen absorbing alloy. On the other hand, if this substitution ratio "y" exceeds over 0.2, the crystal structure of the hydrogen absorbing alloy may be changed thus reducing the quantity of hydrogen absorption, and resulting in a deterioration of discharge capacity of the hydrogen absorbing electrode containing this hydrogen absorbing alloy. A preferable range of the substitution ratio "y" is $0.01 \leq y \leq 0.18$.

The reason for limiting the ratio "z" between R and (Ni+M1+M2) in the aforementioned formula (II) is as follows. Namely, if this "z" is not more than 2.5 or not less than 3.25, the quantity of hydrogen absorption or hydrogen desorption of the alloy will be reduced, resulting in a deterioration of discharge capacity of the hydrogen absorbing electrode containing this hydrogen absorbing alloy. Moreover, if this "z" falls outside this limitation, it may become difficult to obtain a hydrogen absorbing alloy consisting mainly of $AB_3$ type crystal-structure phase. A preferable range of the substitution ratio "z" is $2.7 \leq z \leq 3.2$.

The hydrogen absorbing alloy represented by the aforementioned formula (II) may contain unavoidable impurities, other than the aforementioned R, Ni, M1 and M2, at a ratio of 1 wt % or less.

The hydrogen absorbing alloy represented by the aforementioned formula (II) can be manufactured in the same manner as explained in the aforementioned hydrogen absorbing electrodes (a).

As for the conductive material, the polymer binder and the electroconductive substrate constituting the aforementioned paste type electrode, the same materials as explained in the aforementioned hydrogen absorbing electrodes (a) may be employed.

Hydrogen Absorbing Electrodes (c):

This hydrogen absorbing electrode may be in the form of either (1) a pellet type which can be manufactured by mixing the powder of hydrogen absorbing alloy consisting mainly of $AB_3$ type crystal-structure phase and represented by the following formula (III) with conductive powder such as electrolytic copper, and by pressing the resultant mixture into the pellet; or (2) a paste type which can be manufactured by adding a conductive material to the powder of hydrogen absorbing alloy consisting mainly of $AB_3$ type crystal-structure phase and represented by the following formula (III), and by kneading the resultant mixture together with a polymer binder and water to form a paste, which is subsequently filled in a conductive substrate, dried and molded:

$$R1_{1-a}R2_a(Ni_{1-x}M_x)_z \qquad (III)$$

wherein R1 is at least one element selected from the group consisting of La, Ce, Pr and Nd; R2 is at least one element selected from the group consisting of Y, Er, Sm, Gd, Tb, Dy, Ho, Zr, Hf and Ti; M is at least one element selected from the group consisting of Al, Ga, Zn, Cu, Si, Sn, Ag, In, V, Nb and Cr; and a, x and z are respectively a number satisfying conditions: $0.01 \leq a \leq 0.50$, $0.01 \leq x \leq 0.2$, and $2.5 < z < 3.25$.

Examples of the $AB_3$ type crystal structure are the same as explained in the aforementioned hydrogen absorbing electrodes (a). This hydrogen absorbing alloy may have both $PuNi_3$ type and $CeNi_3$ type crystal structures.

Due to the same reasons as explained in the aforementioned hydrogen absorbing electrodes (a), the hydrogen absorbing alloy should preferably have the phase of $AB_3$ type crystal structure at a ratio (areal ratio) of 50% or more based on the hydrogen absorbing alloy. More preferable areal ratio of this phase is 70% or more.

This hydrogen absorbing alloy may contain a phase of an $AB_5$ type crystal structure, a phase of an $AB_2$ type crystal structure and a phase of an $A_2B_7$ type crystal structure.

The R1 in the aforementioned formula (III) may be at least one element selected from the group consisting of La, Ce, Pr and Nd as mentioned above. However, in view of saving the cost for the hydrogen absorbing electrode, the employment of misch metal, which is a mixture of rare earth elements is preferable. Specifically, this misch metal comprises La, Ce, Pr and Nd, the total of which accounting for 99 wt %, and one kind of which contains 50 wt % or more of Ce and 30 wt % or less of La (Mm), while another kind of which is enriched with La as compared with Lm.

Preferable examples of the M in the aforementioned formula (III) are Al, Ga, Zn, Cu, Si, Sn, V, Nb and Cr.

The reason for limiting the substitution ratio "a" of R1 in the aforementioned formula (III) is as follows. Namely, if this substitution ratio "a" is less than 0.01 or more than 0.5, the hydrogen absorbing alloy may not exhibit a suitable equilibrium hydrogen pressure and at the same time, it may become difficult to improve the desorption of hydrogen. A preferable range of the substitution ratio "a" is $0.05 \leq a \leq 0.3$.

The reason for limiting the substitution ratio "x" of M in the aforementioned formula (III) is as follows. Namely, if this substitution ratio "x" is less than 0.01, it may become difficult to improve the desorption of hydrogen by the hydrogen absorbing alloy. On the other hand, if this substitution ratio "x" exceeds over 0.2, the crystal structure of the hydrogen absorbing alloy may be changed thus reducing the quantity of hydrogen absorption, and resulting in a deterioration of discharge capacity of the hydrogen absorbing electrode containing this hydrogen absorbing alloy. A preferable range of the substitution ratio "x" is $0.02 \leq x \leq 0.18$.

The reason for limiting the ratio "z" between (R1+R2) and (Ni+M) in the aforementioned formula (III) is as follows. Namely, if this "z" is not more than 2.5 or not less than 3.25, the quantity of hydrogen absorption or hydrogen desorption of the alloy will be reduced, resulting in a deterioration of discharge capacity of the hydrogen absorbing electrode containing this hydrogen absorbing alloy. Moreover, if this "z" falls outside this limitation, it may become difficult to obtain a hydrogen absorbing alloy consisting mainly of $AB_3$ type crystal-structure phase. A preferable range of the substitution ratio "z" is $2.7 \leq z \leq 3.2$.

The hydrogen absorbing alloy represented by the aforementioned formula (III) may contain unavoidable impurities, other than the aforementioned R1, R2, Ni and M, at a ratio of 1 wt % or less.

The hydrogen absorbing alloy represented by the aforementioned formula (III) can be manufactured in the same manner as explained in the aforementioned hydrogen absorbing electrodes (a).

As for the conductive material, the polymer binder and the electroconductive substrate constituting the aforementioned paste type electrode, the same materials as explained in the aforementioned hydrogen absorbing electrodes (a) may be employed.

Hydrogen Absorbing Electrodes (d):

This hydrogen absorbing electrode may be in the form of either (1) a pellet type which can be manufactured by mixing the powder of hydrogen absorbing alloy consisting mainly of $AB_3$ type crystal-structure phase and represented by the following formula (IV) with conductive powder such as electrolytic copper, and by pressing the resultant mixture into the pellet; or (2) a paste type which can be manufactured by adding a conductive material to the powder of hydrogen absorbing alloy consisting mainly of $AB_3$ type crystal-structure phase and represented by the following formula (IV), and by kneading the resultant mixture together with a polymer binder and water to form a paste, which is subsequently filled in a conductive substrate, dried and molded:

$$R1_{1-a}R2_a(Ni_{1-x-y}M1_xM2_y)_z \qquad (IV)$$

wherein R1 is at least one element selected from the group consisting of La, Ce, Pr and Nd; R2 is at least one element selected from the group consisting of Y, Er, Sm, Gd, Tb, Dy, Ho, Zr, Hf and Ti; M1 is at least one element selected from the group consisting of Co, Mn and Fe; M2 is at least one element selected from the group consisting of Al, Ga, Zn, Cu, Si, Sn, Ag, In, V, Nb and Cr; and a, x, y and z are respectively a number satisfying conditions: $0.01 \leq a \leq 0.50$, $0.01 \leq x \leq 0.5$, $0.01 \leq y \leq 0.2$, and $2.5 < z < 3.25$.

Examples of the $AB_3$ type crystal structure are the same as explained in the aforementioned hydrogen absorbing electrodes (a). This hydrogen absorbing alloy may have both $PuNi_3$ type and $CeNi_3$ type crystal structures.

Due to the same reasons as explained in the aforementioned hydrogen absorbing electrodes (a), the hydrogen absorbing alloy should preferably have the phase of $AB_3$ type crystal structure at a ratio (areal ratio) of 50% or more based on the hydrogen absorbing alloy. More preferable areal ratio of this phase is 70% or more.

This hydrogen absorbing alloy may contain a phase of an $AB_5$ type crystal structure, a phase of an $AB_2$ type crystal structure and a phase of an $A_2B_7$ type crystal structure.

The R1 in the aforementioned formula (IV) may be at least one element selected from the group consisting of La, Ce, Pr and Nd as mentioned above. However, in view of saving the cost for the hydrogen absorbing electrode, the employment of misch metal (Mm, Lm), which is a mixture of rare earth elements is preferable.

One of the M1 in the aforementioned formula (IV) should preferably be Co.

Preferable examples of the M2 in the aforementioned formula (IV) are Al, Ga, Zn, Cu, Si, Sn, V, Nb and Cr.

The reason for limiting the substitution ratio "a" of R1 in the aforementioned formula (IV) is the same as explained in the aforementioned hydrogen absorbing electrode (c).

The reason for limiting the substitution ratio "x" of M1 in the aforementioned formula (IV) is as follows.

Namely, if this substitution ratio "x" is less than 0.01, the hydrogen absorbing alloy may not exhibit a suitable equilibrium hydrogen pressure and it may become difficult to improve the desorption of hydrogen. On the other hand, if this substitution ratio "x" exceeds over 0.5, the crystal structure of the hydrogen absorbing alloy may be changed thus reducing the quantity of hydrogen absorption, and resulting in a deterioration of discharge capacity of the hydrogen absorbing electrode containing this hydrogen absorbing alloy. A preferable range of the substitution ratio "x" is $0.05 \leq x \leq 0.4$.

The reason for limiting the substitution ratio "y" of M2 in the aforementioned formula (IV) is as follows. Namely, if this substitution ratio "y" is less than 0.01, the hydrogen absorbing alloy may not exhibit a suitable equilibrium hydrogen pressure and it may become difficult to improve the desorption of hydrogen. On the other hand, if this substitution ratio "y" exceeds over 0.2, the crystal structure of the hydrogen absorbing alloy may be changed thus reducing the quantity of hydrogen absorption, and resulting in a deterioration of discharge capacity of the hydrogen absorbing electrode containing this hydrogen absorbing alloy. A preferable range of the substitution ratio "y" is $0.02 \leq y \leq 0.18$.

The reason for limiting the ratio "z" between (R1+R2) and (Ni+M1+M2) in the aforementioned general formula (IV) is as follows. Namely, if this "z" is not more than 2.5 or not less than 3.25, the quantity of hydrogen absorption of the alloy will be reduced, resulting in a deterioration of discharge capacity of the hydrogen absorbing electrode containing this hydrogen absorbing alloy. Moreover, if this "z" falls outside this limitation, it may become difficult to obtain a hydrogen absorbing alloy consisting mainly of $AB_3$ type crystal-structure phase. A preferable range of the substitution ratio "z" is $2.7 \leq z \leq 3.2$.

The hydrogen absorbing alloy represented by the aforementioned formula (IV) may contain unavoidable impurities, other than the aforementioned R1, R2, Ni, M1 and M2, at a ratio of 1 wt % or less.

The hydrogen absorbing alloy represented by the aforementioned formula (IV) can be manufactured in the same manner as explained in the aforementioned hydrogen absorbing electrodes (a).

As for the conductive material, the polymer binder and the electroconductive substrate constituting the aforementioned paste type electrode, the same materials as explained in the aforementioned hydrogen absorbing electrodes (a) may be employed.

Hydrogen Absorbing Electrodes (e):

This hydrogen absorbing electrode contains a hydrogen absorbing alloy, a multi-phase intermetallic compound, consisting mainly of at least one phase selected from the first group (hereinafter referred to as RTx group) consisting of a $CaCu_5$ type crystal-structure phase, a $Ce_2Ni_7$ type crystal-structure phase and a $Gd_2Co_7$ type crystal-structure phase, and at least one phase selected from the second group (hereinafter referred to as RTy group) consisting of a CrB type crystal-structure phase, a FeB type crystal-structure phase, an $AlB_2$ type crystal-structure phase, a $CeCu_2$ type crystal-structure phase, a $Ni_2In$ type crystal-structure phase, a $CaIn_2$ type crystal-structure phase, a $Fe_2P$ type crystal-structure phase and a $ThSi_2$ type crystal-structure phase. The ratio between a height of a strongest peak Iy of the second group and a height of a strongest peak Ix of the first group (Iy/Ix) in an X-ray diffraction by Cu-Kα ray falls within a range of 0.01 to 10. This hydrogen absorbing alloy (this multi-phase intermetallic compound) is represented by the following formula (V):

$$R(Ni_{1-d}T_d)_z \qquad (V)$$

wherein R is at least one element selected from the group consisting of rare earth elements, Y, Zr, Hf and Ti; T is at least one element selected from the group consisting of Co, Fe, Cu, Mn, Al, Si, B, Sn, Ga, Ge, Zn and Ag; and d and z are respectively a number satisfying conditions: $d \leq 0.9$, and $1.5 \leq z \leq 4$.

This hydrogen absorbing electrode may take the following two types of form (1) and (2).

(1) A pellet type which can be manufactured by mixing the powder of the aforementioned hydrogen absorbing alloy with conductive powder such as electrolytic copper, and by pressing the resultant mixture into the pellet.

(2) A paste type which can be manufactured by adding a conductive material to the powder of the aforementioned hydrogen absorbing alloy and by kneading the resultant mixture together with a polymer binder and water to form a paste, which is subsequently filled in a conductive substrate, dried and molded into a predetermined shape.

The R in the aforementioned formula (V) may be at least one element selected from the group consisting of rare earth elements, Y, Zr, Hf and Ti as mentioned above. However, R should preferably contain 50% or more in total of Y and rare earth elements. Furthermore, in view of saving the cost for the hydrogen absorbing electrode, the rare earth elements should preferably be one or more elements selected from La, Ce, Pr and Nd. In particular, the employment of misch metal which is a mixture of rare earth elements is preferable, most preferable examples of the misch metal being Ce-rich misch metal (Mm) and La-rich misch metal (Lm).

Preferable examples of the T in the aforementioned formula (V) are Co, Fe, Cu, Mn, Al, Si, B, Sn and Zn.

The d in the above formula (V) should preferably be in the range of $d \leq 0.7$ (i.e. Ni should preferably be 30 atom % or more).

The reason for limiting the ratio "z" in the aforementioned formula (V) is as follows. Namely, if this "z" is not more than 1.5 or not less than 4, the aforementioned ratio in strongest peak (Iy/Ix) may fall outside the range of 0.1 to 10, resulting in a deterioration of discharge capacity of the hydrogen absorbing electrode containing this hydrogen absorbing alloy. A preferable range of the "z" is $2 \leq z \leq 3.7$.

The hydrogen absorbing alloy should preferably have aforementioned at least one phase of the RTx group and aforementioned at least one phase of the RTy group at an areal ratio of 70% or more based on the hydrogen absorbing alloy. If the areal ratio is less than 70%, the initial activity of the alloy may be deteriorated. As a result, the discharge capacity at the initial stage of usage of the hydrogen absorbing electrode containing this hydrogen absorbing alloy may be decreased. More preferable areal ratio of these phases is 80% or more.

This hydrogen absorbing alloy may contain a phase of $PuNi_3$ type crystal structure; a phase of $CeNi_3$ type crystal-structure; or a phase of $MgCu_2$ type crystal-structure.

If the above-mentioned alloy contains one phase which belongs to the RTx group, the strongest peak height Ix of this group is assumed to be a height of the highest peak of the X-ray diffraction by Cu-Kα ray which is specific to the crystal structure of said one phase. If the alloy contains two or more phases which belong to the RTx group, the strongest peak of the X-ray diffraction by Cu-Kα ray specific to the crystal structure of each phase is measured, and the sum Ix of the strongest peak heights is obtained.

If the alloy contains one phase which belongs to the RTy group, the strongest peak height Iy of this group is assumed to be a height of the highest peak of the X-ray diffraction by Cu-Kα ray which is specific to the crystal structure of said one phase. If the alloy contains two or more phases which belong to the RTy group, the strongest peak of the X-ray diffraction by Cu-Kα ray specific to the crystal structure of each phase is measured, and the sum Iy of the strongest peak heights is obtained.

The reason for limiting the ratio (Iy/Ix) between a height of a strongest peak Iy belonging to the crystal structure RTy group and a height of a strongest peak Ix belonging to the crystal structure of RTx group in an X-ray diffraction by Cu-Kα ray to the range of 0.01 to 10 is as follows. Namely, if this Iy/Ix is less than 0.01, the ratio of AB type or $AB_2$ type intermetallic-compound phase having a large hydrogen absorbing capacity in the hydrogen absorbing alloy may become relatively small, so that it may become difficult to improve the discharge capacity of the hydrogen absorbing electrode containing this hydrogen absorbing alloy. On the other hand, if this Iy/Ix exceeds over 10, it may become difficult to improve the hydrogen desorbing property of the AB type or $AB_2$ type intermetallic-compound phase, thus reducing the discharge capacity of the hydrogen absorbing electrode containing this hydrogen absorbing alloy. A preferable range of the ratio Iy/Ix is 0.1 to 5.

The hydrogen absorbing alloy represented by the aforementioned formula (V) may contain, other than the aforementioned R, Ni and T, unavoidable impurities such as oxygen, nitrogen and carbon at a ratio of 1 wt % or less.

Phases of the RTx group should preferably be constituted by an intermetallic compound represented by the following formula (VI):

$$R(Ni_{1-b}T_b)_x \qquad (VI)$$

wherein R is at least one element selected from rare earth elements, Y, Zr, Hf and Ti; T is at least one element selected from the group consisting of Co, Fe, Cu, Mn, Al, Si, B, Sn, Ga, Ge, Zn and Ag; and b and x are respectively a number satisfying conditions: $b \leq 0.9$, and $3.5 \leq x \leq 5$.

Phases of the RTy group should preferably be constituted by an intermetallic compound represented by the following formula (VII):

$$R(Ni_{1-c}T_c)_y \qquad (VII)$$

wherein R is at least one element selected from rare earth elements, Y, Zr, Hf and Ti; T is at least one element selected from the group consisting of Co, Fe, Cu, Mn, Al, Si, B, Sn, Ga, Ge, Zn and Ag; and c and y are respectively a number satisfying conditions: $c \leq 0.9$, and $1 \leq y \leq 2$.

The R in the aforementioned formulas (VI) and (VII) may be at least one element selected from the group consisting of rare earth elements, Y, Zr, Hf and Ti as mentioned above. However, R should preferably contain 50% or more in total of Y and rare earth elements. Furthermore, in view of saving the cost for the hydrogen absorbing electrode, the rare earth elements should preferably be one or more elements selected from La, Ce, Pr and Nd. In particular, the employment of misch metal which is a mixture of rare earth elements is preferable, most preferable examples of the misch metal being Ce-rich misch metal (Mm) and La-rich misch metal (Lm).

This hydrogen absorbing alloy can be manufactured by the following method for instance.

First of all, each element of this hydrogen absorbing alloy is weighed in a predetermined ratio and the resultant mixture is then subjected to an induction melting or an arc melting in an argon atmosphere thereby to obtain an alloy ingot having an aimed composition.

The alloy ingot thus obtained may be ultra-quenched by means of a melt-quenching method or a gas-atomizing method so as to enhance the uniformity of the alloy.

Furthermore, the alloy ingot obtained may be heat-treated at a temperature ranging from 300° C. to less than the melting point thereof for 0.1 to 500 hours in vacuum or in an inert gas atmosphere.

As for the conductive material, the polymer binder and the electroconductive substrate constituting the aforementioned paste type electrode, the same materials as explained in the aforementioned hydrogen absorbing electrodes (a) may be employed.

Next, one embodiment of the metal oxide-hydrogen secondary battery according to this invention will be explained as follows.

This metal oxide-hydrogen secondary battery comprises a positive electrode containing a metal oxide, a negative electrode consisting of an electrode selected from any of the aforementioned hydrogen absorbing electrodes (a) to (e), an alkali electrolyte, and a case of desired shape hermetically accommodating these components.

A cylindrical metal oxide-hydrogen secondary battery representing one example of the aforementioned secondary battery will be explained with reference to FIGURE.

Referring to FIGURE, a bottomed cylindrical case 1, which is made of a metal such as a Ni-plated steel is accommodated therein with an electrode group 5 which has been manufactured by spirally winding a stacked body comprising a positive electrode 2, a negative electrode 4 and a separator 3 interposed between these electrodes 2 and 4. The negative electrode 4 is disposed at the outermost periphery of the electrode group 5 so as to electrically contact with the cylindrical case 1. The cylindrical case 1 is also filled with an alkali electrolyte. A first sealing plate 7 formed of a disk having an opening 6 at the center is disposed on the upper opening of the cylindrical case 1. An insulating gasket 8 having a ring-like shape is interposed between the periphery of the first sealing plate 7 and the upper inner wall of the opening of the cylindrical case 1. The peripheral fringe portion of the opening of the cylindrical case 1 is caulked inward so that the first sealing plate 7 is hermetically fixed via the gasket 8 to cylindrical case 1. The positive electrode lead 9 is connected through its one end to the positive electrode 2 and through its other end to the lower surface of the first sealing plate 7. A positive electrode terminal 10 having a hat-like shape is mounted over the first sealing plate 7 in such a manner as to cover the opening 6. A rubber safety valve 11 is disposed in a space surrounded by the first sealing plate 7 and the positive electrode terminal 10 in such a manner as to seal the opening 6. A holding plate 12 formed of an insulating disk having an opening is disposed over the positive electrode terminal 10 in such a manner that the projected portion of the positive electrode terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the positive electrode 2, the separator 3, and the electrolyte will be explained.

(1) The Positive Electrode 2

The metal oxide included in this positive electrode 2 is nickel oxyhydroxide (NiOOH).

This positive electrode 2 can be manufactured as follows for instance. Namely, a conductive material is added to an active material, i.e. nickel hydroxide powder, and the resultant mixture is kneaded together with a polymeric binder and water to prepare a paste, which is then stuffed into an electroconductive substrate and, after being dried, molded into a predetermined shape.

As for the conductive material, cobalt oxide, cobalt hydroxide, metallic cobalt, metallic nickel and carbon can be used.

Examples of polymer binder are carboxymethyl cellulose, methyl cellulose, sodium polyacrylate and polytetrafluoroethylene.

The electroconductive substrate may be formed from a mesh-like, sponge-like, fibrous or felt-like metallic porous body which is made of nickel, stainless steel or a nickel-plated metal.

As for the positive electrode, in addition to those containing nickel oxyhydroxide (NiOOH) as a metal oxide, those containing silver oxide ($Ag_2O$ or AgO) as a metal oxide may be employed.

(2) The Separator 3

The separator 3 may be formed of a nonwoven fabric made of a polymer such as a polypropylene nonwoven fabric, a nylon nonwoven fabric or a nonwoven fabric comprising polypropylene fiber and nylon fiber. In particular, a polypropylene nonwoven fabric having its surface treated into hydrophilic nature is preferable as a separator.

(3) Alkali Electrolyte

With regard to the alkali electrolyte, an aqueous solution comprising only potassium hydroxide (KOH), or a mixed solution containing sodium hydroxide (NaOH) and/or lithium hydroxide (LiOH) in addition to potassium hydroxide (KOH) may be employed.

As explained above, a first hydrogen absorbing electrode according to this invention is characterized in that it contains a hydrogen absorbing alloy consisting mainly of $AB_3$ type crystal-structure phase and represented by the following formula (I):

$$R(Ni_{1-x}M_x)_z \qquad (I)$$

wherein R is at least one element selected from rare earth elements (including Y); M is at least one element selected from the group consisting of Al, Ga, Zn, Sn, Cu, Si, Ag, In, Ti, Zr, Hf, V, Nb, Ta, Cr, Fe, Mn, Mo and W; and x and z are respectively a number satisfying conditions: $0.01 \leq x \leq 0.2$, and $2.5 < z < 3.25$.

This hydrogen absorbing alloy is a rare earth-nickel-based intermetallic compound consisting mainly of $AB_3$ type crystal-structure phase, and since part of Ni is substituted by M such as Al, the lattice constant of the crystal is changed. Therefore, the hydrogen absorbing electrode containing this hydrogen absorbing alloy is modified in such a manner that the quantity of hydrogen absorption is changed due to the $AB_3$ type main phase and that the hydrogen desorption is improved due to the change in lattice constant of the crystal, so that the hydrogen absorbing electrode exhibits a large discharge capacity. Moreover, since the hydrogen absorbing electrode contains a hydrogen absorbing alloy where part of Ni is substituted by M such as Al, the erosion resistance of the electrode can be improved.

A second hydrogen absorbing electrode according to this invention is characterized in that it contains a hydrogen absorbing alloy consisting mainly of $AB_3$ type crystal-structure phase and represented by the following formula (II):

$$R(Ni_{1-x-y}M1_xM2_y)_z \qquad (II)$$

wherein R is at least one element selected from rare earth elements (including Y); M1 is at least one element selected from the group consisting of Co, Mn and Fe; M2 is at least one element selected from the group consisting of Al, Ga, Zn, Sn, Cu, Si, Ag, In, Ti, Zr, Hf, V, Nb, Ta, Cr, Mo and W; and x, y and z are respectively a number satisfying conditions: $0.01 \leq x \leq 0.5$, $0.01 \leq y \leq 0.2$, and $2.5 < z < 3.25$.

This hydrogen absorbing alloy is a rare earth-nickel-based intermetallic compound consisting mainly of $AB_3$ type crystal-structure phase, and since part of Ni is substituted by M1 such as Co and by M2 such as Al, the lattice constant of the crystal is changed. Therefore, the hydrogen absorbing electrode containing this hydrogen absorbing alloy is modified in such a manner that the quantity of hydrogen absorption is changed due to the $AB_3$ type main phase and that the hydrogen desorption is improved due to the change in lattice constant of the crystal, so that the hydrogen absorbing electrode exhibits a large discharge capacity. Moreover, since the hydrogen absorbing electrode contains a hydrogen absorbing alloy where part of Ni is substituted by M1 and M2, the erosion resistance of the electrode can be improved.

A third hydrogen absorbing electrode according to this invention is characterized in that it contains a hydrogen absorbing alloy consisting mainly of $AB_3$ type crystal-structure phase and represented by the following formula (III):

$$R1_{1-a}R2_a(Ni_{1-x}M_x)_z \qquad (III)$$

wherein R1 is at least one element selected from the group consisting of La, Ce, Pr and Nd; R2 is at least one element selected from the group consisting of Y, Er, Sm, Gd, Tb, Dy, Ho, Zr, Hf and Ti; M is at least one element selected from the group consisting of Al, Ga, Zn, Cu, Si, Sn, Ag, In, V, Nb and Cr; and a, x and z are respectively a number satisfying conditions: $0.01 \leq a \leq 0.50$, $0.01 \leq x \leq 0.2$, and $2.5 < z < 3.25$.

This hydrogen absorbing alloy is a rare earth-nickel-based intermetallic compound consisting mainly of $AB_3$ type crystal-structure phase, and since it contains R1 such as La and R2 such as Zr as components thereof, and at the same time, part of Ni is substituted by M such as Al, it exhibits a suitable range of equilibrium hydrogen pressure.

Namely, according to Bajei, there is a relationship represented by the following equation between the equilibrium hydrogen pressure P(H2) in gas phase and the equilibrium potential to a mercury oxide electrode constituting a negative electrode under the conditions of: 20° C., 1 atm and a KOH electrolyte of 6 mol·dm$^{-3}$.

$$E_{eq}(H_2O/H_2)-E(HgO/Hg)=-0.9324-\log P(H_2)$$

Therefore, the hydrogen absorbing electrode containing this hydrogen absorbing alloy exhibits a large discharge capacity due to the suitable equilibrium hydrogen pressure of the $AB_3$ type main phase and due to an improvement of hydrogen desorption property.

A fourth hydrogen absorbing electrode according to this invention is characterized in that it contains a hydrogen absorbing alloy consisting mainly of $AB_3$ type crystal-structure phase and represented by the following formula (IV):

$$R1_{1-a}R2_a(Ni_{1-x-y}M1_xM2_y)_z \qquad (IV)$$

wherein R1 is at least one element selected from the group consisting of La, Ce, Pr and Nd; R2 is at least one element selected from the group consisting of Y, Er, Sm, Gd, Tb, Dy, Ho, Zr, Hf and Ti; M1 is at least one element selected from the group consisting of Co, Mn and Fe; M2 is at least one element selected from the group consisting of Al, Ga, Zn, Cu, Si, Sn, Ag, In, V, Nb and Cr; and a, x, y and z are respectively a number satisfying conditions: $0.01 \leq a \leq 0.50$, $0.01 \leq x \leq 0.5$, $0.01 \leq y \leq 0.2$, and $2.5 < z < 3.25$.

This hydrogen absorbing alloy is a rare earth-nickel-based intermetallic compound consisting mainly of $AB_3$ type crystal-structure phase, and since it contains R1 such as La and R2 such as Zr as components thereof, and at the same time, part of Ni is substituted by M1 such as Co and by M2 such as Al, it exhibits a suitable range of equilibrium hydrogen pressure.

Therefore, the hydrogen absorbing electrode containing this hydrogen absorbing alloy exhibits a large discharge capacity due to the suitable equilibrium hydrogen pressure of the $AB_3$ type main phase and due to an improvement of hydrogen desorption property.

A fifth hydrogen absorbing electrode according to this invention is characterized in that it contains a hydrogen absorbing alloy consisting mainly of at least one phase selected from the first group consisting of a $CaCu_5$ type crystal-structure phase, a $Ce_2Ni_7$ type crystal-structure phase and a $Gd_2Co_7$ type crystal-structure phase, and at least one phase selected from the second group consisting of a CrB type crystal-structure phase, a FeB type crystal-structure phase, an $AlB_2$ type crystal-structure phase, a $CeCu_2$ type crystal-structure phase, a $Ni_2In$ type crystal-structure phase, a $CaIn_2$ type crystal-structure phase, a $Fe_2P$ type crystal-structure phase and a $ThSi_2$ type crystal-structure phase. Further, according to this hydrogen absorbing alloy, the ratio between a strongest peak Ix of the first group and a strongest peak Iy of the second group (Iy/Ix) in an X-ray diffraction by Cu-Kα ray falls within a range of 0.01 to 10. Furthermore, this hydrogen absorbing alloy is represented by the following formula (V):

$$R(Ni_{1-d}T_d)_z \qquad (V)$$

wherein R is at least one element selected from the group consisting of rare earth elements, Y, Zr, Hf and Ti; T is at least one element selected from the group consisting of Co, Fe, Cu, Mn, Al, Si, B, Sn, Ga, Ge, Zn and Ag; and d and z are respectively a number satisfying conditions: $d \leq 0.9$, and $1.5 \leq z \leq 4$.

The hydrogen absorbing alloy employed herein is an alloy of multi-phase consisted essentially of at least one intermetallic compound selected from the first group and at least one intermetallic compound selected from the second group. Further, the hydrogen absorbing alloy exhibits a specific value in a ratio between strongest peaks in an X-ray diffraction by Cu-Kα ray, which is inherent to the crystal structure thereof. Namely, the phases each having specific crystal structure are coexisted at a specific ratio. Accordingly, due to the interaction of phases of these intermetallic compounds, it is possible to improve the hydrogen absorbing property of the electrode, and at the same time, the hydrogen desorbing property can be improved. As a result, it is possible for the hydrogen absorbing electrode containing this hydrogen absorbing alloy to exhibit a large discharge capacity from the initial stage of usage.

The metal oxide-hydrogen secondary battery according to this invention is characterized in that it comprises a positive electrode containing a metal oxide, a negative electrode consisting of a hydrogen absorbing electrode selected from any one of the aforementioned first to fourth hydrogen absorbing electrodes, and an alkali electrolyte.

Since this metal oxide-hydrogen secondary battery is provided with one of the aforementioned first to fourth hydrogen absorbing electrodes, it exhibits a high capacity and excellent charge/discharge cycle property.

Furthermore, the metal oxide-hydrogen secondary battery according to this invention is characterized in that it comprises a positive electrode containing a metal oxide, the aforementioned fifth hydrogen absorbing electrode as a negative electrode, and an alkali electrolyte.

Since this metal oxide-hydrogen secondary battery is capable of exhibiting a high capacity from the beginning of charge/discharge cycle, the charge/discharge cycle life thereof can be improved.

EXAMPLE

This invention will be further explained in detail with reference to preferable examples.

Examples 1–11; and Comparative Examples 1 and 2

Each element was weighed so as to obtain the compositions shown in Table 1 shown below and the resultant compositions were melted in an induction furnace filled with an argon gas atmosphere, thereby preparing 13 kinds of alloy ingot.

These alloy ingots were respectively pulverized to prepare hydrogen absorbing alloy powder having a particle diameter of 150 μm or less. The misch metal (Mm) contained in the hydrogen absorbing alloy of Example 10 was formed of 27.5 at % (atomic %) of La, 50.3 at % of Ce, 5.5 at % of Pr, 16.5 at % of Nd and 0.2 at % of Sm. On the other hand, the misch metal (Lm) contained in the hydrogen absorbing alloy of Example 11 was formed of 84 at % (atomic %) of La, 10 at % of Ce, 1 at % of Pr, 5 at % of Nd and 0.2 at % of Sm.

Each hydrogen absorbing alloy powder was mixed with electrolytic copper powder at a ratio of 1:2 (weight ratio), and 1 g of the resultant mixture was pressed for 5 minutes with a pressure of 10 tons/cm$^2$, thus obtaining 13 kinds of pellet each having a diameter of 12 mm. These pellets were sandwiched between Ni wire nettings, and the peripheral portion thereof was spot-welded. Subsequently, to this pressed body was connected Ni lead wires by means of spot-welding thereby preparing 13 kinds of hydrogen absorbing alloy electrode (a negative electrode).

Each of the negative electrodes thus obtained was dipped into an aqueous solution of 8M(mol/L)-KOH (electrolyte) filled in a case together with a counter electrode (sintered nickel electrode) and a reference electrode (mercury oxide electrode), whereby assembling test cells (Examples 1–11; and Comparative Examples 1 and 2).

The crystal structure of the alloy of each of Examples 1–11; and Comparative Examples 1 and 2 was examined from an X-ray diffraction pattern obtained using Cu-Kα ray as an X-ray source, the results being shown in Table 1 below. Each of the alloys obtained was photographed at different 5 regions through a scanning electron microscope (SEM). The five regions of each alloy were selected at random. Each SEM photograph was examined, determining the ratio of the area the phase of $AB_3$ type crystal structure occupy to the entire area of each photograph image. The average of the ratios determined from the five SEM photographs of each alloy was calculated. The results were as shown in the following Table 1.

Comparative Example 3

A test cell was fabricated by repeating the same procedures as in the case of Examples 1 to 11 except that a hydrogen absorbing alloy powder as explained below was employed in this comparative example.

A thin film of $La_{0.3}Ce_{0.5}Nd_{0.2}$ $(Ni_{0.8}Si_{0.1}Al_{0.1})_{3.24}$ was formed on a glass substrate by means of magnetron R. F. sputtering. The film thus formed was removed from the glass substrate and pulverized, thereby obtaining hydrogen absorbing alloy powder which had particle diameter of 150 μm or less.

Further, the crystal structure and the areal ratio of the phase of $AB_3$ type crystal structure to the alloy were also measured in the same manner as explained above for the alloy of this Comparative Example 3. The results are shown also in Table 1 below.

Then, a charge/discharge cycle test was performed for each of Examples 1–11; and Comparative Examples 1 to 3 at a temperature of 25° C. In this charge/discharge cycle test, the charging was conducted using a current of 100 mA per 1 g of hydrogen absorbing alloy for 4 hours, and after a resting time of 10 minutes, the discharge was conducted using a current of 50 mA per 1 g of hydrogen absorbing alloy until the voltage against the mercury oxide electrode was lowered down to −0.5 V. This charge/discharge cycle was repeated. The maximum discharge capacity of this charge/discharge cycle is shown also in Table 1. In this test, the maximum discharge capacity of Comparative Example 1 employing a negative electrode containing $LaNi_3$ as a hydrogen absorbing alloy was assumed as being "1", and other values obtained were indicated as a relative value based on this value of Comparative Example 1.

TABLE 1

| | Composition | Crystal structure | Areal ratio of $AB_3$ type (%) | Discharge capacity |
|---|---|---|---|---|
| Example 1 | $La(Ni_{0.95}Al_{0.05})_3$ | $PuNi_3$ | 98 | 1.90 |
| Example 2 | $Ce(Ni_{0.9}Ga_{0.1})_{3.05}$ | $CeNi_3$ | 95 | 1.75 |
| Example 3 | $La(Ni_{0.95}Sn_{0.05})_{3.12}$ | $PuNi_3$ | 88 | 1.80 |
| Example 4 | $La(Ni_{0.92}Zn_{0.08})_{3.23}$ | $PuNi_3$ | 85 | 1.68 |
| Example 5 | $La_{0.5}Ce_{0.5}(Ni_{0.83}Cu_{0.17})_{2.95}$ | $CeNi_3$ | 96 | 1.73 |
| Example 6 | $La_{0.9}Nd_{0.1}(Ni_{0.9}Si_{0.1})_{3.1}$ | $PuNi_3$ | 92 | 1.83 |
| Example 7 | $La_{0.4}Ce_{0.6}(Ni_{0.95}Ag_{0.05})_{3.03}$ | $CeNi_3$ | 95 | 1.57 |
| Example 8 | $Ce_{0.9}Pr_{0.1}(Ni_{0.95}Zr_{0.05})_{3.23}$ | $CeNi_3$ | 82 | 1.71 |
| Example 9 | $La_{0.3}Ce_{0.6}Y_{0.1}(Ni_{0.97}Hf_{0.03})_{3.13}$ | $CeNi_3$ | 89 | 1.67 |
| Example 10 | $Mm(Ni_{0.9}Al_{0.05}Ge_{0.05})_{2.96}$ | $CeNi_3$ | 97 | 1.73 |
| Example 11 | $Lm(Ni_{0.9}Ga_{0.07}Cu_{0.03})_{3.02}$ | $PuNi_3$ | 98 | 1.86 |
| Comparative Example 1 | $LaNi_3$ | $PuNi_3$ | 99 | 1.00 |
| Comparative Example 2 | $CeNi_3$ | $CeNi_3$ | 100 | 0.8 |
| Comparative Example 3 | $La_{0.3}Ce_{0.5}Nd_{0.2}(Ni_{0.8}Si_{0.1}Al_{0.1})_{3.24}$ | $CaCu_5$ | 3 (areal ratio of $CaCu_5$ type: 97%) | 1.3 |

As apparent from Table 1, the test cells of Examples 1 to 11 which were provided with an alloy comprising a $AB_3$ type phase as a main phase and represented by the aforementioned formula (I) exhibited a larger discharge capacity as compared with that of the test cell of Comparative Example 1 where $LaNi_3$ was employed as a hydrogen absorbing alloy, with that of the test cell of Comparative Example 2 where $CeNi_3$ was employed as a hydrogen absorbing alloy, or with that of the test cell of Comparative Example 3 where a $AB_5$ type crystal-structure alloy having a composition represented by the aforementioned general (I) was employed as a hydrogen absorbing alloy.

Examples 12–18, and Comparative Example 4

Each element was weighed so as to obtain the compositions shown in Table 2 shown below, and the resultant compositions were melted in an induction furnace filled with an argon gas atmosphere and then heat-treated at a temperature of 950° C. for 36 hours, thereby preparing 8 kinds of alloy ingot. The misch metal (Mm) contained in the hydrogen absorbing alloy of Examples 16 and 17 was formed of 27.5 at % (atomic %) of La, 50.3 at % of Ce, 5.5 at % of Pr, 16.5 at % of Nd and 0.2 at % of Sm. On the other hand, the misch metal (Lm) contained in the hydrogen absorbing alloy of Example 18 was formed of 84 at % (atomic %) of La, 10 at % of Ce, 1 at % of Pr, 5 at % of Nd and 0.2 at % of Sm.

These alloy ingots were respectively pulverized to prepare hydrogen absorbing alloy powder having a particle diameter of 80 μm or less. Each hydrogen absorbing alloy powder was then mixed with electrolytic copper powder at a ratio of 1:3 (weight ratio), and 1 g of the resultant mixture was pressed for 8 minutes with a pressure of 8 tons/cm$^2$, thus obtaining 8 kinds of pellet each having a diameter of 10 mm. These pellets were sandwiched between Ni wire nettings, and the peripheral portion thereof was spot-welded. Subsequently, to this pressed body was connected Ni lead wires by means of spot-welding thereby preparing 8 kinds of hydrogen absorbing alloy electrode (a negative electrode).

Each of the negative electrodes thus obtained was dipped into an aqueous solution of 8M-KOH (electrolyte) filled in a case together with a counter electrode (sintered nickel electrode) and a reference electrode (mercury oxide electrode), whereby assembling test cells (Examples 12–18; and Comparative Example 4).

Then, a charge/discharge cycle test was performed for each of Examples 12–18; and Comparative Example 4 at a temperature of 25° C. In this charge/discharge cycle test, the charging was conducted using a current of 100 mA per 1 g of hydrogen absorbing alloy for 4 hours, and after a resting time of 10 minutes, the discharge was conducted using a current of 50 mA per 1 g of hydrogen absorbing alloy until the voltage against the mercury oxide electrode was lowered down to –0.5 V. This charge/discharge cycle was repeated. The maximum discharge capacity of this charge/discharge cycle is shown also in Table 2. In this test, the maximum discharge capacity of Comparative Example 4 employing a negative electrode containing $LaNi_3$ as a hydrogen absorbing alloy was assumed as being "1", and other values obtained were indicated as a relative value based on this value of Comparative Example 4.

Further, the crystal structure and the areal ratio of the phase of $AB_3$ type crystal structure to the alloy were also measured in the same manner as explained above for the alloy of each of Examples 12–18; and Comparative Example 4. The results are shown also in Table 2 below.

TABLE 2

| | Composition | Crystal structure | Areal ratio of $AB_3$ type (%) | Discharge capacity |
|---|---|---|---|---|
| Example 12 | $La_{0.7}Nd_{0.3}(Ni_{0.98}Ti_{0.02})_{3.2}$ | $PuNi_3$ | 85 | 1.61 |
| Example 13 | $La(Ni_{0.9}V_{0.1})_3$ | $PuNi_3$ | 98 | 1.89 |
| Example 14 | $La(Ni_{0.97}Nb_{0.03})_{2.98}$ | $PuNi_3$ | 97 | 1.68 |
| Example 15 | $Ce(Ni_{0.9}Ti_{0.1})_{3.02}$ | $CeNi_3$ | 95 | 1.72 |
| Example 16 | $Mm(Ni_{0.9}Cr_{0.1})_{3.1}$ | $CeNi_3$ | 92 | 1.82 |
| Example 17 | $Mm(Ni_{0.98}Mo_{0.02})_{3.03}$ | $CeNi_3$ | 95 | 1.65 |
| Example 18 | $Lm(Ni_{0.98}W_{0.02})_{3.02}$ | $PrNi_3$ | 90 | 1.67 |
| Comparative Example 4 | $LaNi_3$ | $PrNi_3$ | 99 | 1.00 |

As apparent from Table 2, the test cells of Examples 12 to 18 which were provided with an alloy comprising a $AB_3$ type crystal-structure phase as a main phase and represented by the aforementioned formula (I) exhibited a larger discharge capacity as compared with that of the test cell of Comparative Example 4 where $LaNi_3$ was employed as a hydrogen absorbing alloy.

Examples 19–29, and Comparative Examples 5 and 6

Each element was weighed so as to obtain the compositions shown in Table 3 shown below, and the resultant compositions were melted in an induction furnace filled with an argon gas atmosphere and then heat-treated at a temperature of 900° C. for 50 hours, thereby preparing 13 kinds of alloy ingot. The misch metal (Mm) contained in the hydrogen absorbing alloy of Examples 22 and 29 was formed of 27.5 at % (atomic %) of La, 50.3 at % of Ce, 5.5 at % of Pr, 16.5 at % of Nd and 0.2 at % of Sm. On the other hand, the misch metal (Lm) contained in the hydrogen absorbing alloy of Example 28 was formed of 84 at % (atomic %) of La, 10 at % of Ce, 1 at % of Pr, 5 at % of Nd and 0.2 at % of Sm.

These alloy ingots were respectively pulverized to prepare hydrogen absorbing alloy powder having a particle diameter of 150 μm or less. Each hydrogen absorbing alloy powder was then mixed with electrolytic copper powder at a ratio of 1:3 (weight ratio), and 1 g of the resultant mixture was pressed for 5 minutes with a pressure of 10 tons/cm$^2$, thus obtaining 13 kinds of pellet each having a diameter of 12 mm. These pellets were sandwiched between Ni wire nettings, and the peripheral portion thereof was spot-welded. Subsequently, to this pressed body was connected Ni lead wires by means of spot-welding thereby preparing 13 kinds of hydrogen absorbing alloy electrode (a negative electrode).

Each of the negative electrodes thus obtained was dipped into an aqueous solution of 8M-KOH (electrolyte) filled in a case together with a counter electrode (sintered nickel electrode) and a reference electrode (mercury oxide electrode), whereby assembling test cells (Examples 19–29; and Comparative Examples 5 and 6).

Comparative Example 7

A test cell was fabricated by repeating the same procedures as in the case of Examples 19 to 29 except that a hydrogen absorbing alloy powder to be explained below was employed in this comparative example.

A thin film of $La_{0.5}Ce_{0.5}Nd_{0.5}(Ni_{0.5}Mn_{0.3}Si_{0.1}Al_{0.1})3.24$ was formed on a glass substrate by means of magnetron R.F. sputtering. The film thus formed was removed from the glass substrate and pulverized, thereby obtaining hydrogen absorbing alloy powder which had particle diameter of 150 μm or less.

Then, a charge/discharge cycle test was performed for each of Examples 19–29; and Comparative Examples 5 to 7 at a temperature of 25° C. In this charge/discharge cycle test, the charging was conducted using a current of 100 mA per 1 g of hydrogen absorbing alloy for 4 hours, and after a resting time of 10 minutes, the discharge was conducted using a current of 50 mA per 1 g of hydrogen absorbing alloy until the voltage against the mercury oxide electrode was lowered down to −0.5 V. This charge/discharge cycle was repeated. The maximum discharge capacity of this charge/discharge cycle is shown also in Table 3. In this test, the maximum discharge capacity of Comparative Example 5 employing a negative electrode containing $LaNi_3$ as a hydrogen absorbing alloy was assumed as being "1", and other values obtained were indicated as a relative value based on this value of Comparative Example 5.

Further, the crystal structure and the areal ratio of the phase of $AB_3$ type crystal structure to the alloy were also measured in the same manner as explained above for the alloy of each of Examples 19–29; and Comparative Examples 5 to 7. The results are shown also in Table 3 below.

TABLE 3

| | Composition | Crystal structure | Areal ratio of $AB_3$ type (%) | Discharge capacity |
|---|---|---|---|---|
| Example 19 | $La(Ni_{0.75}Co_{0.20}Al_{0.05})_3$ | $PuNi_3$ | 98 | 1.95 |
| Example 20 | $Ce(Ni_{0.7}Mn_{0.2}Al_{0.1})_{3.05}$ | $CeNi_3$ | 99 | 1.78 |
| Example 21 | $La(Ni_{0.8}Fe_{0.13}Ga_{0.07})_{3.12}$ | $PuNi_3$ | 89 | 1.76 |
| Example 22 | $Lm(Ni_{0.47}Co_{0.3}Mn_{0.15}Zn_{0.08})_{3.23}$ | $PuNi_3$ | 86 | 1.83 |
| Example 23 | $La_{0.5}Ce_{0.5}(Ni_{0.7}Mn_{0.1}Fe_{0.03}Cu_{0.17})_{2.95}$ | $CeNi_3$ | 97 | 1.79 |
| Example 24 | $La_{0.7}Nd_{0.2}Pr_{0.1}(Ni_{0.5}Co_{0.4}Si_{0.1})_{3.1}$ | $PuNi_3$ | 95 | 1.84 |
| Example 25 | $La_{0.4}Ce_{0.6}(Ni_{0.5}Co_{0.3}Mn_{0.15}Ag_{0.05})_{3.03}$ | $CeNi_3$ | 97 | 1.72 |
| Example 26 | $Ce_{0.8}Pr_{0.2}(Ni_{0.80}Mn_{0.15}Zr_{0.05})_{3.24}$ | $CeNi_3$ | 83 | 1.75 |
| Example 27 | $La_{0.4}Ce_{0.5}Y_{0.1}(Ni_{0.77}Co_{0.2}Hf_{0.03})_{3.18}$ | $CeNi_3$ | 87 | 1.73 |
| Example 28 | $Mm(Ni_{0.70}Mn_{0.20}Al_{0.05}Sn_{0.05})_{2.96}$ | $CeNi_3$ | 94 | 1.76 |
| Example 29 | $Lm(Ni_{0.45}Co_{0.30}Mn_{0.15}Ga_{0.07}Cu_{0.03})_{3.02}$ | $PuNi_3$ | 97 | 1.88 |
| Comparative Example 5 | $LaNi_3$ | $PuNi_3$ | 98 | 1.00 |
| Comparative Example 6 | $Ce(Ni_{0.67}Co_{0.33})_3$ | $CeNi_3$ | 99 | 0.98 |
| Comparative Example 7 | $La_{0.5}Ce_{0.5}(Ni_{0.5}Mn_{0.3}Si_{0.1}Al_{0.1})_{3.24}$ | $CaCu_5$ | 3 (areal ratio of $CaCu_5$ type: 97%) | 1.29 |

As apparent from Table 3, the test cells of Examples 19 to 29 which were provided with an alloy comprising a $AB_3$ type crystal-structure phase as a main phase and represented by the aforementioned formula (II) exhibited a larger discharge capacity as compared with that of the test cell of Comparative Example 5 where $LaNi_3$ was employed as a hydrogen absorbing alloy, with that of the test cell of Comparative Example 6 where $Ce(Ni_{0.67}Co_{0.33})_3$ was employed as a hydrogen absorbing alloy, or with that of the test cell of Comparative Example 7 where a $AB_5$ type crystal structure having a composition represented by the aforementioned formula (II) was employed as a hydrogen absorbing alloy.

Examples 30–36, and Comparative Example 8

Each element was weighed so as to obtain the compositions shown in Table 4 shown below, and the resultant compositions were melted in an induction furnace filled with an argon gas atmosphere and then heat-treated at a temperature of 980° C. for 24 hours, thereby preparing 8 kinds of alloy ingot. The misch metal (Mm) contained in the hydrogen absorbing alloy of Examples 34 and 35 was formed of 27.5 at % (atomic %) of La, 50.3 at % of Ce, 5.5 at % of Pr, 16.5 at % of Nd and 0.2 at % of Sm. On the other hand, the misch metal (Lm) contained in the hydrogen absorbing alloy of Example 36 was formed of 84 at % (atomic %) of La, 10 at % of Ce, 1 at % of Pr, 5 at % of Nd and 0.2 at % of Sm.

These alloy ingots were respectively pulverized to prepare hydrogen absorbing alloy powder having a particle diameter of 100 μm or less. Each hydrogen absorbing alloy powder was then mixed with electrolytic copper powder at a ratio of 1:3 (weight ratio), and 1 g of the resultant mixture was pressed for 8 minutes with a pressure of 10 tons/cm$^2$, thus obtaining 8 kinds of pellet each having a diameter of 10 mm. These pellets were sandwiched between Ni wire nettings, and the peripheral portion thereof was spot-welded. Subsequently, to this pressed body was connected Ni lead wires by means of spot-welding thereby preparing 8 kinds of hydrogen absorbing alloy electrode (a negative electrode).

Each of the negative electrodes thus obtained was dipped into an aqueous solution of 8M-KOH (electrolyte) filled in a case together with a counter electrode (sintered nickel electrode) and a reference electrode (mercury oxide electrode), whereby assembling test cells (Examples 30–36; and Comparative Example 8).

Then, a charge/discharge cycle test was performed for each of Examples 30–36; and Comparative Example 8 at a temperature of 25° C. In this charge/discharge cycle test, the charging was conducted using a current of 100 mA per 1 g of hydrogen absorbing alloy for 4 hours, and after a resting time of 10 minutes, the discharge was conducted using a current of 50 mA per 1 g of hydrogen absorbing alloy until the voltage against the mercury oxide electrode was lowered down to −0.5 V. This charge/discharge cycle was repeated. The maximum discharge capacity of this charge/discharge cycle is shown also in Table 4. In this test, the maximum discharge capacity of Comparative Example 8 employing a negative electrode containing LaNi$_3$ as a hydrogen absorbing alloy was assumed as being "1", and other values obtained were indicated as a relative value based on this value of Comparative Example 8.

Further, the crystal structure and the areal ratio of the phase of AB$_3$ type crystal structure to the alloy were also measured in the same manner as explained above for the alloy of each of Examples 30–36; and Comparative Example 8. The results are shown also in Table 4 below.

Comparative Example 8 where LaNi$_3$ was employed as a hydrogen absorbing alloy.

Examples 37–46, and Comparative Examples 9 to 11

Each element was weighed so as to obtain the compositions shown in Table 5 shown below, and the resultant compositions were melted in an induction furnace filled with an argon gas atmosphere, thereby preparing 13 kinds of alloy ingot. Then, these alloy ingots were melted and the resultant melts were respectively dropped in an argon gas atmosphere on the surface of a copper roll rotating at a peripheral velocity of 20 m/sec thereby to quench the melts, thereby obtaining a thin alloy strip respectively. Subsequently, each of the thin alloy strips was heat-treated at a temperature of 600° C. for one hour and then pulverized to prepare hydrogen absorbing alloy powder having a particle diameter of 75 μm or less. The misch metal (Mm) contained in the hydrogen absorbing alloy of Example 45 and Comparative Example 11 was formed of 27.5 at % (atomic %) of La, 50.3 at % of Ce, 5.5 at % of Pr, 16.5 at % of Nd and 0.2 at % of Sm. On the other hand, the misch metal (Lm) contained in the hydrogen absorbing alloy of Examples 40 and 46 was formed of 84 at % (atomic %) of La, 10 at % of Ce, 1 at % of Pr, 5 at % of Nd and 0.2 at % of Sm.

Each hydrogen absorbing alloy powder was then mixed with electrolytic copper powder at a ratio of 1:3 (weight ratio), and 1 g of the resultant mixture was pressed for 5 minutes with a pressure of 10 tons/cm$^2$, thus obtaining 13 kinds of pellet each having a diameter of 12 mm. These pellets were sandwiched between Ni wire nettings, and the peripheral portion thereof was spot-welded. Subsequently, to this pressed body was connected Ni lead wires by means of spot-welding thereby preparing 13 kinds of hydrogen absorbing alloy electrode (a negative electrode).

Each of the negative electrodes thus obtained was dipped into an aqueous solution of 8M-KOH (electrolyte) filled in a case together with a counter electrode (sintered nickel electrode) and a reference electrode (mercury oxide electrode), whereby assembling 13 kinds of test cells.

Comparative Example 12

A test cell was fabricated by repeating the same procedures as in the case of Examples 37 to 46 except that a hydrogen absorbing alloy powder to be explained below was employed in this comparative example.

A thin film of $La_{0.5}Ce_{0.3}Tb_{0.2}(Ni_{0.8}Si_{0.1}Al_{0.1})_{3.24}$ was formed on a glass substrate by means of magnetron R.F. sputtering. The film thus formed was removed from the glass

TABLE 4

| | Composition | Crystal structure | Areal ratio of AB$_3$ type (%) | Discharge capacity |
|---|---|---|---|---|
| Example 30 | $La_{0.7}Nd_{0.3}(Ni_{0.68}Co_{0.3}Ti_{0.02})_{3.1}$ | PuNi$_3$ | 95 | 1.67 |
| Example 31 | $La(Ni_{0.8}Mn_{0.15}V_{0.05})_{3.02}$ | PuNi$_3$ | 98 | 1.92 |
| Example 32 | $La_{0.8}Pr_{0.2}(Ni_{0.77}Co_{0.15}Fe_{0.05}Nb_{0.03})_{2.95}$ | PuNi$_3$ | 95 | 1.73 |
| Example 33 | $Ce(Ni_{0.68}Co_{0.2}Mn_{0.1}Ta_{0.02})_{3.0}$ | CeNi$_3$ | 98 | 1.72 |
| Example 34 | $Mm(Ni_{0.7}Mn_{0.2}Cr_{0.1})_{3.05}$ | CeNi$_3$ | 96 | 1.87 |
| Example 35 | $Mm(Ni_{0.68}Mn_{0.25}Fe_{0.05}Mo_{0.02})_{3.01}$ | CeNi$_3$ | 97 | 1.71 |
| Example 36 | $Lm(Ni_{0.78}Co_{0.2}W_{0.02})_{3.05}$ | PuNi$_3$ | 98 | 1.69 |
| Comparative Example 8 | LaNi$_3$ | PuNi$_3$ | 99 | 1.00 |

As apparent from Table 4, the test cells of Examples 30 to 36 which were provided with an alloy comprising a AB$_3$ type crystal-structure phase as a main phase and represented by the aforementioned formula (II) exhibited a larger discharge capacity as compared with that of the test cell of substrate and pulverized, thereby obtaining hydrogen absorbing alloy powder which had particle diameter of 75 μm or less.

Comparative Example 13

A test cell was fabricated by repeating the same procedures as in the case of Examples 37 to 46 except that a hydrogen absorbing alloy powder to be explained below was employed in this comparative example.

A thin film of $La_{0.4}Ce_{0.4}Y_{0.2}(Ni_{0.6}Mn_{0.2}Si_{0.1}Al_{0.1})_{3.24}$ was formed on a glass substrate by means of magnetron R.F. sputtering. The film thus formed was removed from the glass substrate and pulverized, thereby obtaining hydrogen absorbing alloy powder which had particle diameter of 75 μm or less.

Then, a charge/discharge cycle test was performed for each test cell at a temperature of 25° C. In this charge/discharge cycle test, the charging was conducted using a current of 100 mA per 1 g of hydrogen absorbing alloy for 4 hours, and after a resting time of 10 minutes the discharge was conducted using a current of 50 mA per 1 g of hydrogen absorbing alloy until the voltage against the mercury oxide electrode was lowered down to −0.65 V. This charge/discharge cycle was repeated. The maximum discharge capacity of this charge/discharge cycle is shown in Table 6. In this test, the maximum discharge capacity of Comparative Example 9 employing a negative electrode containing $LaNi_3$ as a hydrogen absorbing alloy was assumed as being "1", and other values obtained were indicated as a relative value based on this value of Comparative Example 9.

Further, the crystal structure and the areal ratio of the phase of $AB_3$ type crystal structure to the alloy were also measured in the same manner as explained above for the alloy of each of Examples 37–46; and Comparative Examples 9 to 13. The results are shown also in Table 5 below.

Furthermore, each of the hydrogen absorbing alloy powders was placed in a reaction vessel of a high pressure Sieverts's device and heated at a temperature of 60° C. for one hour in vacuo to perform the degassing of the alloy. Thereafter, the equilibrium hydrogen pressure of the alloy was measured by Sieverts's method (JIS H7201). The results are shown also in Table 6. In this measurement of equilibrium hydrogen pressure, the equilibrium hydrogen pressure of $LaNi_3$ (Comparative Example 9) was assumed as being "1", and other values obtained were indicated as a relative value based on this value of $LaNi_3$.

TABLE 5

| | Composition | Crystal structure | Areal ratio of $AB_3$ type (%) |
|---|---|---|---|
| Example 37 | $La_{0.9}Zr_{0.1}(Ni_{0.85}Co_{0.10}Zn_{0.05})_{2.96}$ | $PuNi_3$ | 97 |
| Example 38 | $Ce_{0.8}Zr_{0.2}(Ni_{0.9}Al_{0.05}Cu_{0.05})_{3.05}$ | $CeNi_3$ | 96 |
| Example 39 | $La_{0.95}Zr_{0.05}(Ni_{0.85}Fe_{0.1}Si_{0.05})_{3.10}$ | $PuNi_3$ | 93 |
| Example 40 | $Lm_{0.9}Zr_{0.1}(Ni_{0.92}V_{0.05}Ag_{0.03})_{3.20}$ | $PuNi_3$ | 85 |
| Example 41 | $La_{0.5}Ce_{0.4}Zr_{0.1}(Ni_{0.90}Fe_{0.08}Al_{0.02})_{3.20}$ | $CeNi_3$ | 87 |
| Example 42 | $La_{0.7}Nd_{0.1}Pr_{0.1}Zr_{0.1}Ni_{0.95}Nb_{0.05})_{2.85}$ | $PuNi_3$ | 90 |
| Example 43 | $Ce_{0.7}Pr_{0.2}Zr_{0.1}(Ni_{0.90}Mn_{0.05}Cr_{0.05})_{2.90}$ | $CeNi_3$ | 91 |

TABLE 5-continued

| | Composition | Crystal structure | Areal ratio of $AB_3$ type (%) |
|---|---|---|---|
| Example 44 | $La_{0.4}Ce_{0.5}Zr_{0.1}(Ni_{0.90}Ga_{0.07}V_{0.03})_{3.20}$ | $CeNi_3$ | 86 |
| Example 45 | $Mm_{0.9}Zr_{0.1}(Ni_{0.80}Fe_{0.10}Al_{0.05}Cr_{0.05})_{2.80}$ | $CeNi_3$ | 89 |
| Example 46 | $Lm_{0.8}Zr_{0.2}(Ni_{0.90}Si_{0.07}Ag_{0.03})_{3.10}$ | $PuNi_3$ | 91 |
| Comparative Example 9 | $LaNi_3$ | $PuNi_3$ | 99 |
| Comparative Example 10 | $CeNi_3$ | $CeNi_3$ | 100 |
| Comparative Example 11 | $MmNi_3$ | $CeNi_3$ | 99 |
| Comparative Example 12 | $La_{0.5}Ce_{0.3}Tb_{0.2}(Ni_{0.8}Si_{0.1}Al_{0.1})_{3.24}$ | $CaCu_5$ | 3 (areal ratio of $CaCu_5$ type: 97%) |
| Comparative Example 13 | $La_{0.4}Ce_{0.4}Y_{0.2}(Ni_{0.6}M_{0.2}Si_{0.1}Al_{0.1})_{3.24}$ | $CaCu_5$ | 4 (areal ratio of $CaCu_5$ type: 96%) |

TABLE 6

| | Equilibrium hydrogen pressure | Discharge capacity of test cell |
|---|---|---|
| Example 37 | 23.2 | 1.82 |
| Example 38 | 30.2 | 1.72 |
| Example 39 | 14.2 | 1.88 |
| Example 40 | 19.8 | 1.95 |
| Example 41 | 37.2 | 1.78 |
| Example 42 | 18.6 | 1.84 |
| Example 43 | 53.2 | 1.68 |
| Example 44 | 40.3 | 1.65 |
| Example 45 | 43.6 | 1.70 |
| Example 46 | 21.3 | 1.71 |
| Comparative Example 9 | 1.0 | 1.0 |
| Comparative Example 10 | 12.5 | 0.81 |
| Comparative Example 11 | 5.8 | 0.83 |
| Comparative Example 12 | 45.2 | 1.32 |
| Comparative Example 13 | 53.8 | 1.29 |

As apparent from Tables 5 and 6, the hydrogen absorbing alloys of Examples 37 to 46 exhibited a suitable equilibrium hydrogen pressure.

The test cells of Examples 38, 40, 42, 44 and 46 which were provided with an alloy comprising a $AB_3$ type crystal-structure phase as a main phase and represented by the aforementioned formula (III) exhibited a larger discharge capacity as compared with that of the test cell of Comparative Example 9 where $LaNi_3$ was employed as a hydrogen absorbing alloy, with that of the test cell of Comparative Example 10 where $CeNi_3$ was employed as a hydrogen absorbing alloy, with that of the test cell of Comparative Example 11 where an $MmNi_3$ was employed as a hydrogen absorbing alloy, or with that of the test cell of Comparative Example 12 where $AB_5$ type crystal structure having a composition represented by the aforementioned formula (III) was employed as a hydrogen absorbing alloy.

Further, the test cells of Examples 37, 39, 41, 43 and 45 which were provided with an alloy comprising a $AB_3$ type crystal-structure phase as a main phase and represented by the aforementioned formula (IV) exhibited a larger discharge capacity as compared with that of the test cell of Comparative Example 9, with that of the test cell of Comparative Example 10, with that of the test cell of Comparative Example 11, or with that of the test cell of Comparative Example 13 where $AB_5$ type crystal structure having a composition represented by the aforementioned formula (IV) was employed as a hydrogen absorbing alloy.

Examples 47–57

Each element was weighed so as to obtain the compositions shown in Table 7 shown below, and the resultant compositions were melted in an induction furnace filled with an argon gas atmosphere, thereby preparing 11 kinds of alloy ingot. Then, these alloy ingots were melted and the resultant melts were respectively dropped in an argon gas atmosphere on the surface of a copper roll rotating at a peripheral velocity of 20 m/sec thereby to quench the melts, thereby obtaining a thin alloy strip respectively. Subsequently, each of the thin alloy strips was heat-treated at a temperature of 650° C. for two hour and then pulverized to prepare hydrogen absorbing alloy powder having a particle diameter of 75 μm or less. The misch metal (Mm) contained in the hydrogen absorbing alloy of Example 56 was formed of 27.5 at % (atomic %) of La, 50.3 at % of Ce, 5.5 at % of Pr, 16.5 at % of Nd and 0.2 at % of Sm. On the other hand, the misch metal (Lm) contained in the hydrogen absorbing alloy of Examples 50 and 57 was formed of 84 at % (atomic %) of La, 10 at % of Ce, 1 at % of Pr, 5 at % of Nd and 0.2 at % of Sm.

Each hydrogen absorbing alloy powder was then mixed with electrolytic copper powder at a ratio of 1:3 (weight ratio), and 1 g of the resultant mixture was pressed for 5 minutes with a pressure of 10 tons/cm², thus obtaining 11 kinds of pellet each having a diameter of 12 mm. These pellets were sandwiched between Ni wire nettings, and the peripheral portion thereof was spot-welded. Subsequently, to this pressed body was connected Ni lead wires by means of spot-welding thereby preparing 11 kinds of hydrogen absorbing alloy electrode (a negative electrode).

Each of the negative electrodes thus obtained was dipped into an aqueous solution of 8M-KOH (electrolyte) filled in a case together with a counter electrode (sintered nickel electrode) and a reference electrode (mercury oxide electrode), whereby assembling 11 kinds of test cells.

Then, a charge/discharge cycle test was performed for each test cell at a temperature of 25° C. In this charge/discharge cycle test, the charging was conducted using a current of 100 mA per 1 g of hydrogen absorbing alloy for 4 hours, and after a resting time of 10 minutes, the discharge was conducted using a current of 50 mA per 1 g of hydrogen absorbing alloy until the voltage against the mercury oxide electrode was lowered down to −0.65 V. This charge/discharge cycle was repeated. The maximum discharge capacity of this charge/discharge cycle is shown also in Table 7 together with the results of Comparative Examples 9, 12 and 13. In this test, the maximum discharge capacity of Comparative Example 9 employing a negative electrode containing $LaNi_3$ as a hydrogen absorbing alloy was assumed as being "1", and other values obtained were indicated as a relative value based on this value of Comparative Example 9.

Further, the crystal structure and the areal ratio of the phase of $AB_3$ type crystal structure to the alloy were also measured in the same manner as explained above for the alloy of each of Examples 47–57. The results are shown also in Table 7 below. Table 7 also shows the results of the test cells of Comparative Examples 9, 12 and 13.

TABLE 7

| | Composition | Crystal structure | Areal ratio of $AB_3$ type (%) | Discharge capacity |
|---|---|---|---|---|
| Example 47 | $La_{0.9}Zr_{0.1}(Ni_{0.95}Zn_{0.05})_3$ | $PuNi_3$ | 98 | 1.95 |
| Example 48 | $Ce_{0.8}Hf_{0.2}(Ni_{0.9}Mn_{0.05}Cu_{0.05})_{3.05}$ | $CeNi_3$ | 96 | 1.78 |
| Example 49 | $La_{0.8}Ti_{0.2}(Ni_{0.95}Si_{0.05})_{2.85}$ | $PuNi_3$ | 92 | 1.76 |
| Example 50 | $Lm_{0.9}Zr_{0.1}(Ni_{0.9}Co_{0.07}Ag_{0.03})_{2.9}$ | $PuNi_3$ | 91 | 1.83 |
| Example 51 | $La_{0.5}Ce_{0.4}Hf_{0.1}(Ni_{0.85}Al_{0.15})_{3.2}$ | $CeNi_3$ | 86 | 1.79 |
| Example 52 | $La_{0.7}Nd_{0.1}Pr_{0.1}Ti_{0.1}(Ni_{0.9}Cu_{0.05}Nb_{0.05})_{2.8}$ | $PuNi_3$ | 88 | 1.84 |
| Example 53 | $La_{0.3}Ce_{0.6}Ti_{0.1}(Ni_{0.8}Al_{0.1}Cu_{0.05}Nb_{0.05})_{3.1}$ | $CeNi_3$ | 90 | 1.72 |
| Example 54 | $Ce_{0.7}Pr_{0.2}Zr_{0.1}(Ni_{0.8}Mn_{0.15}Cr_{0.05})_{3.2}$ | $CeNi_3$ | 87 | 1.75 |
| Example 55 | $La_{0.4}Ce_{0.5}Hf_{0.1}(Ni_{0.85}Co_{0.1}V_{0.05})_{2.9}$ | $CeNi_3$ | 91 | 1.73 |
| Example 56 | $Mm_{0.9}Hf_{0.1}(Ni_{0.92}Al_{0.05}Cr_{0.03})_3$ | $CeNi_3$ | 97 | 1.76 |
| Example 57 | $Lm_{0.8}Zr_{0.2}(Ni_{0.9}Co_{0.04}Si_{0.03}Ag_{0.03})_{3.1}$ | $PuNi_3$ | 96 | 1.88 |
| Comparative Example 9 | $LaNi_3$ | $PuNi_3$ | 99 | 1.00 |
| Comparative Example 12 | $La_{0.5}Ce_{0.3}Tb_{0.2}(Ni_{0.8}Si_{0.1}Al_{0.1})_{3.24}$ | $CaCu_5$ | 2 (areal ratio of $CaCu_5$ type: 98%) | 1.35 |
| Comparative Example 13 | $La_{0.4}Ce_{0.4}Y_{0.2}(Ni_{0.6}Mn_{0.2}Si_{0.1}Al_{0.1})_{3.24}$ | $CaCu_5$ | 3 (areal ratio of $CaCu_5$ type: 97%) | 1.28 |

As apparent from Table 7, the test cells of Examples 47, 49, 51, 52, 53 and 56 which were provided with an alloy comprising a $AB_3$ type crystal-structure phase as a main phase and represented by the aforementioned formula (III) exhibited a larger discharge capacity as compared with that of the test cells of Comparative Examples 9 and 12. Further, the test cells of Examples 48, 50, 54, 55 and 57 which were provided with an alloy comprising a $AB_3$ type crystal-structure phase as a main phase and represented by the aforementioned formula (IV) exhibited a larger discharge capacity as compared with that of the test cells of Comparative Examples 9 and 13.

Examples 58–68

Each element was weighed so as to obtain the compositions shown in Table 8 shown below, and the resultant compositions were melted in an induction furnace filled with an argon gas atmosphere, thereby preparing 11 kinds of alloy ingot. Then, these alloy ingots were melted and the resultant melts were respectively dropped in an argon gas atmosphere on the surface of a copper roll rotating at a surface velocity of 15 m/sec thereby to quench the melts, thereby obtaining a thin alloy strip respectively. Subsequently, each of the thin alloy strips was heat-treated at a temperature of 550° C. for five hour and then pulverized to prepare hydrogen absorbing alloy powder having a particle diameter of 75 μm or less. The misch metal (Mm) contained in the hydrogen absorbing alloy of Example 67 was formed of 27.5 at % (atomic %) of La, 50.3 at % of Ce, 5.5 at % of Pr, 16.5 at % of Nd and 0.2 at % of Sm. On the other hand, the misch metal (Lm) contained in the hydrogen absorbing alloy of Examples 61 and 68 was formed of 84 at % (atomic %) of La, 10 at % of Ce, 1 at % of Pr, 5 at % of Nd and 0.2 at % of Sm.

Each hydrogen absorbing alloy powder was then mixed with electrolytic copper powder at a ratio of 1:3 (weight ratio), and 1 g of the resultant mixture was pressed for 5 minutes with a pressure of 10 tons/cm$^2$, thus obtaining 11 kinds of pellet each having a diameter of 12 mm. These pellets were sandwiched between Ni wire nettings, and the peripheral portion thereof was spot-welded. Subsequently, to this pressed body was connected Ni lead wires by means of spot-welding thereby preparing 11 kinds of hydrogen absorbing alloy electrode (a negative electrode).

Each of the negative electrodes thus obtained was dipped into an aqueous solution of 8M-KOH (electrolyte) filled in a case together with a counter electrode (sintered nickel electrode) and a reference electrode (mercury oxide electrode), whereby assembling 11 kinds of test cells.

Then, a charge/discharge cycle test was performed for each test cell at a temperature of 25° C. In this charge/discharge cycle test, the charging was conducted using a current of 100 mA per 1 g of hydrogen absorbing alloy for 4 hours, and after a resting time of 10 minutes, the discharge was conducted using a current of 50 mA per 1 g of hydrogen absorbing alloy until the voltage against the mercury oxide electrode was lowered down to −0.65 V. This charge/discharge cycle was repeated. The maximum discharge capacity of this charge/discharge cycle is shown also in Table 9 together with the results of Comparative Examples 9 and 13. In this test, the maximum discharge capacity of Comparative Example 9 employing a negative electrode containing LaNi$_3$ as a hydrogen absorbing alloy was assumed as being "1", and other values obtained were indicated as a relative value based on this value of Comparative Example 9.

Further, the crystal structure and the areal ratio of the phase of AB$_3$ type crystal structure to the alloy were also measured in the same manner as explained above for the alloy of each of Examples 58–68. The results are shown also in Table 9 below. Table 9 also shows the results of the test cells of Comparative Examples 9 and 13.

Furthermore, each of the hydrogen absorbing alloy powders was placed in a reaction vessel of a high pressure Sieverts's device and heated at a temperature of 60° C. for one hour in vacuo to perform the degassing of the alloy. Thereafter, the equilibrium hydrogen pressure of the alloy was measured by Sieverts' method (JIS H7201). The results are shown also in Table 9 together with results of Comparative Examples 9 and 13. In this measurement of equilibrium hydrogen pressure, the equilibrium hydrogen pressure of LaNi$_3$ (Comparative Example 9) was assumed as being "1", and other values obtained were indicated as a relative value based on this value of LaNi$_3$.

TABLE 8

| | Composition | Crystal structure | Areal ratio of AB$_3$ type (%) |
|---|---|---|---|
| Example 58 | La$_{0.9}$Zr$_{0.1}$(Ni$_{0.75}$Co$_{0.20}$Zn$_{0.05}$)$_3$ | PuNi$_3$ | 98 |
| Example 59 | Ce$_{0.95}$Hf$_{0.05}$(Ni$_{0.7}$Mn$_{0.2}$Cu$_{0.1}$)$_{3.05}$ | CeNi$_3$ | 96 |
| Example 60 | La$_{0.8}$Ti$_{0.2}$(Ni$_{0.8}$Fe$_{0.1}$Si$_{0.1}$)$_{3.1}$ | PuNi$_3$ | 93 |
| Example 61 | Lm$_{0.9}$Zr$_{0.1}$(Ni$_{0.4}$Co$_{0.3}$Ag$_{0.3}$)$_{3.2}$ | PuNi$_3$ | 82 |
| Example 62 | La$_{0.5}$Ce$_{0.4}$Hf$_{0.1}$(Ni$_{0.7}$Fe$_{0.2}$Al$_{0.1}$)$_{3.2}$ | CeNi$_3$ | 83 |
| Example 63 | La$_{0.7}$Nd$_{0.1}$Pr$_{0.1}$Ti$_{0.1}$(Ni$_{0.5}$Mn$_{0.4}$Nb$_{0.1}$)$_{3.1}$ | PuNi$_3$ | 88 |
| Example 64 | La$_{0.3}$Ce$_{0.6}$Ti$_{0.1}$(Ni$_{0.5}$Co$_{0.3}$Cu$_{0.1}$Nb$_{0.1}$)$_{3.1}$ | CeNi$_3$ | 90 |
| Example 65 | Ce$_{0.7}$Pr$_{0.2}$Zr$_{0.1}$(Ni$_{0.8}$Mn$_{0.15}$Cr$_{0.05}$)$_{2.95}$ | CeNi$_3$ | 91 |
| Example 66 | La$_{0.4}$Ce$_{0.5}$Hf$_{0.1}$(Ni$_{0.8}$Co$_{0.15}$V$_{0.05}$)$_{2.8}$ | CeNi$_3$ | 89 |
| Example 67 | Mm$_{0.9}$Hf$_{0.1}$(Ni$_{0.7}$Fe$_{0.2}$Al$_{0.05}$Cr$_{0.05}$)$_{2.9}$ | CeNi$_3$ | 90 |
| Example 68 | Lm$_{0.8}$Zr$_{0.2}$(Ni$_{0.45}$Co$_{0.3}$Mn$_{0.15}$Si$_{0.07}$Ag$_{0.03}$)$_{2.95}$ | PuNi$_3$ | 92 |
| Comparative Example 9 | LaNi$_3$ | PuNi$_3$ | 99 |
| Comparative Example 13 | La$_{0.4}$Ce$_{0.4}$Y$_{0.2}$(Ni$_{0.6}$Mn$_{0.2}$Si$_{0.1}$Al$_{0.1}$)$_{3.24}$ | CaCu$_5$ | 3 (areal ratio of CaCu$_5$ type: 97%) |

TABLE 9

| | Equilibrium hydrogen pressure | Discharge capacity of test cell |
|---|---|---|
| Example 58 | 18.3 | 1.95 |
| Example 59 | 34.8 | 1.78 |
| Example 60 | 23.2 | 1.76 |
| Example 61 | 28.2 | 1.83 |
| Example 62 | 40.5 | 1.79 |
| Example 63 | 21.3 | 1.84 |
| Example 64 | 43.3 | 1.72 |
| Example 65 | 39.2 | 1.75 |
| Example 66 | 38.5 | 1.73 |
| Example 67 | 33.8 | 1.76 |
| Example 68 | 25.8 | 1.88 |
| Comparative Example 9 | 1.0 | 1.00 |
| Comparative Example 13 | 32.0 | 1.28 |

As apparent from Tables 8 and 9, the hydrogen absorbing alloys of Examples 58 to 68 which contained a AB$_3$ type crystal-structure phase as a main phase and were represented by the aforementioned formula (IV) exhibited a suitable equilibrium hydrogen pressure. Further, the test cells of Examples 58 to 68 exhibited a larger discharge capacity as compared with that of the test cells of Comparative Examples 9 and 13.

Examples 69–75, and Comparative Example 14

Each element was weighed so as to obtain the compositions shown in Table 10 shown below, and the resultant compositions were melted in an induction furnace filled with an argon gas atmosphere and then heat-treated at a temperature of 930° C. for 50 hours, thereby preparing 8 kinds of alloy ingot. These alloy ingots were respectively pulverized to prepare hydrogen absorbing alloy powder having a particle diameter of 100 μm or less. The misch metal (Mm) contained in the hydrogen absorbing alloy of Examples 73 and 74 was formed of 27.5 at % (atomic %) of La, 50.3 at % of Ce, 5.5 at % of Pr, 16.5 at % of Nd and 0.2 at % of Sm. On the other hand, the misch metal (Lm) contained in the hydrogen absorbing alloy of Example 75 was formed of 84 at % (atomic %) of La, 10 at % of Ce, 1 at % of Pr, 5 at % of Nd and 0.2 at % of Sm.

Each hydrogen absorbing alloy powder was then mixed with electrolytic copper powder at a ratio of 1:3 (weight ratio), and 1 g of the resultant mixture was pressed for 8 minutes with a pressure of 10 tons/cm$^2$, thus obtaining 8 kinds of pellet each having a diameter of 12 mm. These pellets were sandwiched between Ni wire nettings, and the peripheral portion thereof was spot-welded. Subsequently, to this pressed body was connected Ni lead wires by means of spot-welding thereby preparing 8 kinds of hydrogen absorbing alloy electrode (a negative electrode).

Each of the negative electrodes thus obtained was dipped into an aqueous solution of 8M-KOH (electrolyte) filled in a case together with a counter electrode (sintered nickel electrode) and a reference electrode (mercury oxide electrode), whereby assembling 8 kinds of test cells.

Then, a charge/discharge cycle test was performed for each of Examples 69–75; and Comparative Example 14 at a temperature of 25° C. In this charge/discharge cycle test, the charging was conducted using a current of 100 mA per 1 g of hydrogen absorbing alloy for 4 hours, and after a resting time of 10 minutes, the discharge was conducted using a current of 50 mA per 1 g of hydrogen absorbing alloy until the voltage against the mercury oxide electrode was lowered down to −0.65 V. This charge/discharge cycle was repeated. The maximum discharge capacity of this charge/discharge cycle is shown also in Table 10. In this test, the maximum discharge capacity of Comparative Example 14 employing a negative electrode containing LaNi$_3$ as a hydrogen absorbing alloy was assumed as being "1", and other values obtained were indicated as a relative value based on this value of Comparative Example 14.

Further, the crystal structure and the areal ratio of the phase of AB$_3$ type crystal structure to the alloy were also measured in the same manner as explained above for the alloy of each of Examples 69–75; and Comparative Example 14. The results are shown also in Table 10 below.

discharge capacity as compared with that of the test cell of Comparative Example 14 where LaNi$_3$ was employed as a hydrogen absorbing alloy.

Examples 76–87, and Comparative Examples 15 to 20

Each element was weighed so as to obtain the compositions shown in Table 11 shown below, and the resultant compositions were melted in an induction furnace filled with an argon gas atmosphere, thereby preparing 18 kinds of alloy ingot. Then, these alloy ingots were melted and the resultant melts were respectively dropped in an argon gas atmosphere on the surface of a copper roll rotating at a surface velocity of 15 m/sec thereby to quench the melts, thereby obtaining a thin alloy strip respectively. Subsequently, each of the thin alloy strips was pulverized to prepare hydrogen absorbing alloy powder having a particle diameter of 80 μm or less. The misch metal (Mm) contained in the hydrogen absorbing alloy of Examples 85 and 87 was formed of 27.5 at % (atomic %) of La, 50.3 at % of Ce, 5.5 at % of Pr, 16.5 at % of Nd and 0.2 at % of Sm. On the other hand, the misch metal (Lm) contained in the hydrogen absorbing alloy of Example 86 was formed of 84 at % (atomic %) of La, 10 at % of Ce, 1 at % of Pr, 5 at % of Nd and 0.2 at % of Sm.

Each hydrogen absorbing alloy powder was then mixed with electrolytic copper powder at a ratio of 1:3 (weight ratio), and 1 g of the resultant mixture was pressed for 5 minutes with a pressure of 10 tons/cm$^2$, thus obtaining 18 kinds of pellet each having a diameter of 12 mm. These pellets were sandwiched between Ni wire nettings, and the peripheral portion thereof was spot-welded. Subsequently, to this pressed body was connected Ni lead wires by means of spot-welding thereby preparing 18 kinds of hydrogen absorbing alloy electrode (a negative electrode).

Each of the negative electrodes thus obtained was dipped into an aqueous solution of 8M-KOH (electrolyte) filled in a case together with a counter electrode (sintered nickel electrode) and a reference electrode (mercury oxide electrode), whereby assembling test cells (Examples 76–87, and Comparative Examples 15 to 20).

Then, a charge/discharge cycle test was performed for each test cell of Examples 76–87, and Comparative Examples 15 to 20 at a temperature of 25° C. In this charge/discharge cycle test, the charging was conducted using a current of 100 mA per 1 g of hydrogen absorbing alloy for 4 hours, and after a resting time of 10 minutes, the

TABLE 10

| | Composition | Crystal structure | Areal ratio of AB$_3$ type (%) | Discharge capacity |
| --- | --- | --- | --- | --- |
| Example 69 | La$_{0.4}$Nd$_{0.3}$Y$_{0.3}$(Ni$_{0.8}$Co$_{0.15}$Si$_{0.05}$)$_{3.1}$ | PuNi$_3$ | 95 | 1.62 |
| Example 70 | La$_{0.7}$Er$_{0.3}$(Ni$_{0.8}$Mn$_{0.15}$V$_{0.05}$)$_{3.02}$ | PuNi$_3$ | 98 | 1.89 |
| Example 71 | La$_{0.6}$Pr$_{0.2}$Gd$_{0.2}$(Ni$_{0.77}$Co$_{0.15}$Fe$_{0.08}$)$_{2.95}$ | PuNi$_3$ | 97 | 1.68 |
| Example 72 | Ce$_{0.5}$Y$_{0.48}$Sm$_{0.02}$(Ni$_{0.68}$Co$_{0.3}$Cr$_{0.02}$)$_{3.02}$ | CeNi$_3$ | 99 | 1.71 |
| Example 73 | Mm$_{0.6}$Y$_{0.2}$Ho$_{0.2}$(Ni$_{0.7}$Mn$_{0.2}$Cr$_{0.1}$)$_{3.05}$ | PuNi$_3$ | 96 | 1.90 |
| Example 74 | Mm$_{0.9}$Y$_{0.09}$Tb$_{0.01}$(Ni$_{0.68}$Mn$_{0.25}$Fe$_{0.07}$)$_{3.01}$ | CeNi$_3$ | 98 | 1.69 |
| Example 75 | Lm$_{0.8}$Y$_{0.15}$Dy$_{0.05}$(Ni$_{0.78}$Co$_{0.2}$Nb$_{0.02}$)$_{3.05}$ | PuNi$_3$ | 95 | 1.65 |
| Comparative Example 14 | LaNi$_3$ | PuNi$_3$ | 99 | 1.00 |

As apparent from Table 10, the test cells of Examples 69 to 75 which were provided with an alloy comprising a AB$_3$ type crystal-structure phase as a main phase and represented by the aforementioned formula (IV) exhibited a larger discharge was conducted using a current of 50 mA per 1 g of hydrogen absorbing alloy until the voltage against the mercury oxide electrode was lowered down to −0.5 V. This charge/discharge cycle was repeated. The maximum discharge capacity of this charge/discharge cycle is shown also in Table 12. In this test, the maximum discharge capacity of Comparative Example 15 employing a negative electrode containing $LaNi_2$ as a hydrogen absorbing alloy was assumed as being "1", and other values obtained were indicated as a relative value based on this value of Comparative Example 15. Table 15 also shows the results measured on the characteristics illustrated in the following items (1) to (3).

(1) The crystal structure of each hydrogen absorbing alloy was determined from the X-ray diffraction pattern obtained by Cu-Kα ray used as an X-ray source. The crystal structure belonging to the first group (RTx group) and the crystal structure belonging to the second group (RTy group) thus determined are indicated respectively in Table 12.

(2) A strongest peak height Ix belonging to the crystal structure of RTx group and a strongest peak height Iy belonging to the crystal structure of RTy group in an X-ray diffraction pattern obtained by Cu-Kα ray were measured for each hydrogen absorbing alloy in the same manner as explained above. Then, the ratio between these strongest peak heights (Iy/Ix) was calculated, the results being shown in Table 12 below.

(3) Each of the alloys was photographed at different 5 regions through a scanning electron microscope (SEM). The five regions of each alloy were selected at random. Each SEM photograph was examined, determining the ratio of the area the phase of groups $RT_x$ and $Rt_y$ occupy to the entire area of each photograph image. The average of the ratios determined from the five SEM photographs of each alloy was calculated. The results were as shown in the following Table 12.

TABLE 11

| | Composition |
|---|---|
| Example 76 | $La(Ni_{0.55}Mn_{0.05}Cu_{0.4})_{2.75}$ |
| Example 77 | $Ce(Ni_{0.7}Cu_{0.3})_{2.85}$ |
| Example 78 | $La_{0.95}Ti_{0.05}(Ni_{0.7}Co_{0.3})_{3.12}$ |
| Example 79 | $La_{0.3}Y_{0.7}(Ni_{0.6}Co_{0.3}Ga_{0.1})_{2.58}$ |
| Example 80 | $La_{0.9}Ce_{0.1}(Ni_{0.79}Mn_{0.2}Fe_{0.01})_{2.9}$ |
| Example 81 | $La_{0.8}Zr_{0.2}(Ni_{0.5}Mn_{0.1}Si_{0.4})_{2.32}$ |
| Example 82 | $La_{0.4}Ce_{0.6}(Ni_{0.4}Cu_{0.3}Si_{0.3})_{2.45}$ |
| Example 83 | $Ce_{0.3}Y_{0.7}(Ni_{0.3}Cu_{0.35}Sn_{0.35})_{3.25}$ |
| Example 84 | $La_{0.3}Nd_{0.6}Pr_{0.1}(Ni_{0.7}Mn_{0.25}Zn_{0.05})_{3.58}$ |
| Example 85 | $Mm_{0.7}Hf_{0.3}(Ni_{0.4}Co_{0.4}Al_{0.15}Ge_{0.05})_{2.96}$ |
| Example 86 | $Lm(Ni_{0.45}Co_{0.3}Mn_{0.15}Ag_{0.09}B_{0.01})_{3.02}$ |
| Example 87 | $Mm_{0.3}Y_{0.6}Zr_{0.1}(Ni_{0.4}Mn_{0.1}Al_{0.3}Co_{0.2})_{3.42}$ |
| Comparative Example 15 | $LaNi_2$ |
| Comparative Example 16 | $La(Cu_{0.8}Ni_{0.2})_2$ |
| Comparative Example 17 | $Ce(Cu_{0.7}Ni_{0.3})_2$ |
| Comparative Example 18 | LaNi |
| Comparative Example 19 | Yni |
| Comparative Example 20 | YNiAl |

TABLE 12

| | Crystal type (Rty group/RTx group) | Ratio in peak strength Iy/Ix | Areal ratio (%) | Discharge capacity |
|---|---|---|---|---|
| Example 76 | $(AlB_2·CrB)/CaCu_5$ | 2.8 | 91 | 3.30 |
| Example 77 | $CeCu_2/CaCu_5$ | 0.8 | 95 | 3.25 |
| Example 78 | $CrB/CaCu_5$ | 0.3 | 90 | 3.12 |

TABLE 12-continued

| | Crystal type (Rty group/RTx group) | Ratio in peak strength Iy/Ix | Areal ratio (%) | Discharge capacity |
|---|---|---|---|---|
| Example 79 | $FeB/CaCu_5$ | 0.5 | 93 | 2.96 |
| Example 80 | $CrB/Ce_2Ni_7$ | 0.2 | 94 | 3.18 |
| Example 81 | $ThSi_2/CaCu_5$ | 3.5 | 95 | 2.35 |
| Example 82 | $Ni_2In/Ce_2Ni_7$ | 1.2 | 92 | 1.87 |
| Example 83 | $CaIn_2/CaCu_5$ | 0.7 | 95 | 2.71 |
| Example 84 | $CrB/CaCu_5$ | 0.3 | 98 | 2.67 |
| Example 85 | $CrB/Gd_2Co_7$ | 0.1 | 90 | 2.75 |
| Example 86 | $CrB/CaCu_5$ | 0.2 | 89 | 2.86 |
| Example 87 | $Fe_2P/CaCu_5$ | 1.5 | 91 | 2.59 |
| Comparative Example 15 | $MgCu_2$ (Single phase) | — | — | 1 |
| Comparative Example 16 | $AlB_2$ (Single phase) | — | — | 0.50 |
| Comparative Example 17 | $CeCu_2$ (Single phase) | — | — | 0.60 |
| Comparative Example 18 | CrB (Single phase) | — | — | 0.25 |
| Comparative Example 19 | FeB (Single phase) | — | — | 0.20 |
| Comparative Example 20 | $Fe_2P$ (Single phase) | — | — | 0.27 |

As apparent from Tables 11 and 12, the test cells of Examples 76 to 87 which were provided with a negative electrode comprising a hydrogen absorbing alloy of multi-phase exhibited a larger discharge capacity as compared with that of the test cell of Comparative Examples 15 to 20 which were provided with a negative electrode containing a hydrogen absorbing alloy consisting a single AB type phase or a single $AB_2$ type phase.

Additionally, a comparative test in regard to the initial capacity and maximum discharge capacity was performed on the test cell of the aforementioned Example 81 and the test cell of Comparative Example 21 to be discussed below.

Comparative Example 21

Each element was weighed so as to obtain the composition represented by $Zr_{0.5}V_{0.4}Ni_{1.6}Ce_{0.5}$, and the resultant composition was melted in an induction furnace filled with an argon gas atmosphere, thereby preparing alloy ingot. Then, these alloy ingots were melted and the resultant melts were respectively dropped in an argon gas atmosphere on the surface of a copper roll rotating at a surface velocity of 15 m/sec thereby to quench the melts, thereby obtaining a thin alloy strip respectively. Subsequently, each of the thin alloy strips was pulverized to prepare hydrogen absorbing alloy powder having a particle diameter of 80 μm or less. Then, a test cell was assembled by making use of this hydrogen absorbing alloy powder in the same manner as explained in Examples 76 to 87.

When the crystal structure of this hydrogen absorbing alloy according to Comparative Example 21 was determined from the X-ray diffraction pattern obtained by Cu-Kα ray used as an X-ray source, the hydrogen absorbing alloy was found as being consisted only of $MgCu_2$ type crystal-structure phase.

Then, a charge/discharge cycle test was performed for each test cell of Example 81, and Comparative Example 21 at a temperature of 25° C. In this charge/discharge cycle test, the charging was conducted using a current of 100 mA per 1 g of hydrogen absorbing alloy for 4 hours, and after a resting time of 10 minutes, the discharge was conducted using a current of 50 mA per 1 g of hydrogen absorbing alloy until the voltage against the mercury oxide electrode was lowered down to −0.5 V. This charge/discharge cycle was repeated. The discharge capacity at the first cycle and the maximum discharge capacity of this charge/discharge cycle are shown in Table 13. In this test, the maximum discharge capacity of Comparative Example 15 was assumed as being "1", and other values obtained were indicated as a relative value based on this value of Comparative Example 15.

TABLE 13

|  | Initial discharge capacity | Maximum discharge capacity |
| --- | --- | --- |
| Example 81 | 2.28 | 2.35 |
| Comparative Example 21 | 0.4 | 2.40 |

As seen from Table 13, the test cell according to Example 81 which had a composition represented by the formula (V) and containing the phase of groups RTx and RTy at a specific ratio thus exhibiting a multi-phase was found high in the initial capacity as compared with that of the test cell according to Comparative Example 21.

As explained above, it is possible according to this invention to provide a hydrogen absorbing electrode containing a rare earth elements-Ni-based intermetallic compound consisting mainly of $AB_3$ type crystal-structure phase and containing a larger quantity of rare earth element than that of the $AB_5$ type crystal structure, which is free from a problem of difficulty in desorbing hydrogen and hence is capable of exhibiting a large discharge capacity.

As explained above, it is possible according to this invention to provide a hydrogen absorbing electrode containing an intermetallic compound comprising a larger quantity of rare earth element than that of the $AB_5$ type crystal structure, specifically a rare earth elements-Ni-based intermetallic compound having an AB type crystal structure or $AB_2$ type crystal structure, which is free from a problem of difficulty in desorbing hydrogen and hence is capable of exhibiting a large discharge capacity.

When a metal oxide-hydrogen secondary battery is provided with the aforementioned hydrogen absorbing electrode as a negative electrode, it is possible to realize a metal oxide-hydrogen secondary battery exhibiting a high capacity and being excellent in charge/discharge cycle characteristics.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A hydrogen absorbing electrode containing a hydrogen absorbing alloy comprising at least one $AB_3$ type crystal-structure phase selected from the group consisting of $PuNi_3$ type crystal-structure phase and $CeNi_3$ type crystal-structure phase and represented by the following formula (I):

$$R(Ni_{1-x}M_x)_z \qquad (I)$$

wherein R is at least one element selected from rare earth elements (including Y); M is at least one element selected from the group consisting of Al, Ga, Zn, Sn, Cu, Si, Ag, In, Ti, Zr, Hf, V, Nb, Ta, Cr, Fe, Mn, Mo and W; and x and z are respectively a number satisfying conditions: $0.01 \leq x \leq 0.2$, and $2.5 < z < 3.25$.

2. The hydrogen absorbing electrode according to claim 1, wherein said hydrogen absorbing alloy contains said $AB_3$ type phase at an areal ratio of 50% or more based on said hydrogen absorbing alloy.

3. A hydrogen absorbing electrode containing a hydrogen absorbing alloy comprising $AB_3$ type crystal-structure phase and represented by the following formula (II):

$$R(Ni_{1-x-y}M1_xM2_y)_z \qquad (II)$$

wherein R is at least one element selected from rare earth elements (including Y); M1 is at least one element selected from the group consisting of Co, Mn and Fe; M2 is at least one element selected from the group consisting of Al, Ga, Zn, Sn, Cu, Si, Ag, In, Ti, Zr, Hf, V, Nb, Ta, Cr, Mo and W; and x, y and z are respectively a number satisfying conditions: $0.01 \leq x \leq 0.5$, $0.01 \leq y \leq 0.2$, and $2.5 < z < 3.25$.

4. The hydrogen absorbing electrode according to claim 3, wherein said hydrogen absorbing alloy contains said $AB_3$ type phase at an areal ratio of 50% or more based on said hydrogen absorbing alloy.

5. The hydrogen absorbing electrode according to claim 3, wherein said $AB_3$ type phase is at least one selected from the group consisting of $PuNi_3$ type crystal-structure phase and $CeNi_3$ type crystal-structure phase.

6. A hydrogen absorbing electrode containing a hydrogen absorbing alloy comprising $AB_3$ type crystal-structure phase and represented by the following formula (III):

$$R1_{1-a}R2_a(Ni_{1-x}M_x)_z \qquad (III)$$

wherein R1 is at least one element selected from the group consisting of La, Ce, Pr and Nd; R2 is at least one element selected from the group consisting of Y, Er, Sm, Gd, Tb, Dy, Ho, Zr, Hf and Ti; M is at least one element selected from the group consisting of Al, Ga, Zn, Cu, Si, Sn, Ag, In, V, Nb and Cr; and a, x and z are respectively a number satisfying conditions: $0.01 \leq a \leq 0.50$, $0.01 \leq x \leq 0.2$, and $2.5 < z < 3.25$.

7. The hydrogen absorbing electrode according to claim 6, wherein said hydrogen absorbing alloy contains said $AB_3$ type phase at an areal ratio of 50% or more based on said hydrogen absorbing alloy.

8. The hydrogen absorbing electrode according to claim 7, wherein said $AB_3$ type phase is at least one selected from the group consisting of $PuNi_3$ type crystal-structure phase and $CeNi_3$ type crystal-structure phase.

9. A hydrogen absorbing electrode containing a hydrogen absorbing alloy comprising $AB_3$ type crystal-structure phase and represented by the following formula (IV):

$$R1_{1-a}R2_a(Ni_{1-x-y}M1_xM2_y)_z \qquad (IV)$$

wherein R1 is at least one element selected from the group consisting of La, Ce, Pr and Nd; R2 is at least one element selected from the group consisting of Y, Er, Sm, Gd, Tb, Dy, Ho, Zr, Hf and Ti; M1 is at least one element selected from the group consisting of Co, Mn and Fe; M2 is at least one element selected from the group consisting of Al, Ga, Zn, Cu, Si, Sn, Ag, In, V, Nb and Cr; and a, x, y and z are respectively a number satisfying conditions: $0.01 \leq a \leq 0.50$, $0.01 \leq x \leq 0.5$, $0.01 \leq y \leq 0.2$, and $2.5 < z < 3.25$.

10. The hydrogen absorbing electrode according to claim 9, wherein said hydrogen absorbing alloy contains said $AB_3$ type phase at an areal ratio of 50% or more based on said hydrogen absorbing alloy.

11. The hydrogen absorbing electrode according to claim 9, wherein said $AB_3$ type phase is at least one selected from the group consisting of $PuNi_3$ type crystal-structure phase and $CeNi_3$ type crystal-structure phase.

12. A hydrogen absorbing electrode containing a hydrogen absorbing alloy comprising at least one phase selected from the first group consisting of a $CaCu_5$ type crystal-structure phase, a $Ce_2Ni_7$ type crystal-structure phase and a $Gd_2Co_7$ type crystal-structure phase, and at least one phase selected from the second group consisting of a CrB type crystal-structure phase, a FeB type crystal-structure phase, an $AlB_2$ type crystal-structure phase, a $CeCu_2$ type crystal-structure phase, a $Ni_2In$ type crystal-structure phase, a $CaIn_2$ type crystal-structure phase, a $Fe_2P$ type crystal-structure phase and a $ThSi_2$ type crystal-structure phase; a ratio of a strongest peak Iy of said second group to a strongest peak Ix of said first group (Iy/Ix) in an X-ray diffraction by Cu-Kα ray being in a range of 0.01 to 10; and said hydrogen absorbing alloy being represented by the following formula (V):

$$R(Ni_{1-d}T_d)_z \qquad (V)$$

wherein R is at least one element selected from the group consisting of rare earth elements, Y, Zr, Hf and Ti; T is at least one element selected from the group consisting of Co, Fe, Cu, Mn, Al, Si, B, Sn, Ga, Ge, Zn and Ag; and d and z are respectively a number satisfying conditions: $d \leq 0.9$, and $1.5 \leq z \leq 4$.

13. The hydrogen absorbing electrode according to claim 12, wherein said hydrogen absorbing alloy contains said at least one phase selected from the first group and said at least one phase selected from the second group at an areal ratio of 70% or more based on said hydrogen absorbing alloy.

14. The hydrogen absorbing electrode according to claim 12, wherein said R contains 50% or more in total of Y and rare earth elements.

15. The hydrogen absorbing electrode according to claim 12, wherein said T is at least one element selected from the group consisting of Co, Fe, Cu, Mn, Al, Si, B, Sn and Zn.

16. The hydrogen absorbing electrode according to claim 12, wherein said ratio of strongest peaks (Iy/Ix) is in a range of 0.1 to 5.

17. The hydrogen absorbing electrode according to claim 12, wherein said d satisfies a condition of $d \leq 0.7$.

18. The hydrogen absorbing electrode according to claim 12, wherein said z satisfies a condition of $2 \leq z \leq 3.7$.

19. A metal oxide-hydrogen secondary battery comprising a positive electrode containing a metal oxide, a negative electrode and an alkali electrolyte; said negative electrode contains a hydrogen absorbing alloy comprising at least one $AB_3$ type crystal-structure phase selected from the group consisting of $PuNi_3$ type crystal-structure phase and $CeNi_3$ type crystal-structure phase and represented by the following formula (I):

$$R(Ni_{1-x}M_x)_z \qquad (I)$$

wherein R is at least one element selected from rare earth elements (including Y); M is at least one element selected from the group consisting of Al, Ga, Zn, Sn, Cu, Si, Ag, In, Ti, Zr, Hf, V, Nb, Ta, Cr, Fe, Mn, Mo and W; and x and z are respectively a number satisfying conditions: $0.01 \leq x \leq 0.2$, and $2.5 < z < 3.25$.

20. A metal oxide-hydrogen secondary battery comprising a positive electrode containing a metal oxide, a negative electrode and an alkali electrolyte; said negative electrode contains a hydrogen absorbing alloy comprising $AB_3$ type crystal-structure phase and represented by the following formula (II):

$$R(Ni_{1-x-y}M1_xM2_y)_z \qquad (II)$$

wherein R is at least one element selected from rare earth elements (including Y); M1 is at least one element selected from the group consisting of Co, Mn and Fe; M2 is at least one element selected from the group consisting of Al, Ga, Zn, Sn, Cu, Si, Ag, In, Ti, Zr, Hf, V, Nb, Ta, Cr, Mo and W; and x, y and z are respectively a number satisfying conditions: $0.01 \leq x \leq 0.5$, $0.01 \leq y \leq 0.2$, and $2.5 < z < 3.25$.

21. A metal oxide-hydrogen secondary battery comprising a positive electrode containing a metal oxide, a negative electrode and an alkali electrolyte; said negative electrode contains a hydrogen absorbing alloy comprising $AB_3$ type crystal-structure phase and represented by the following formula (III):

$$R1_{1-a}R2_a(Ni_{1-x}M_x)_z \qquad (III)$$

wherein R1 is at least one element selected from the group consisting of La, Ce, Pr and Nd; R2 is at least one element selected from the group consisting of Y, Er, Sm, Gd, Tb, Dy, Ho, Zr, Hf and Ti; M is at least one element selected from the group consisting of Al, Ga, Zn, Cu, Si, Sn, Ag, In, V, Nb and Cr; and a, x and z are respectively a number satisfying conditions: $0.01 \leq a \leq 0.50$, $0.01 \leq x \leq 0.2$, and $2.5 < z < 3.25$.

22. A metal oxide-hydrogen secondary battery comprising a positive electrode containing a metal oxide, a negative electrode and an alkali electrolyte; said negative electrode contains a hydrogen absorbing alloy comprising $AB_3$ type crystal-structure phase and represented by the following formula (IV):

$$R1_{1-a}R2_a(Ni_{1-x-y}M1_xM2_y)_z \qquad (IV)$$

wherein R1 is at least one element selected from the group consisting of La, Ce, Pr and Nd; R2 is at least one element selected from the group consisting of Y, Er, Sm, Gd, Tb, Dy, Ho, Zr, Hf and Ti; M1 is at least one element selected from the group consisting of Co, Mn and Fe; M2 is at least one element selected from the group consisting of Al, Ga, Zn, Cu, Si, Sn, Ag, In, V, Nb and Cr; and a, x, y and z are respectively a number satisfying conditions: $0.01 \leq a \leq 0.50$, $0.01 \leq x \leq 0.5$, $0.01 \leq y \leq 0.2$, and $2.5 < z < 3.25$.

23. A metal oxide-hydrogen secondary battery comprising a positive electrode containing a metal oxide, a negative electrode and an alkali electrolyte; said negative electrode contains a hydrogen absorbing alloy comprising at least one phase selected from the first group consisting of a $CaCu_5$ type crystal-structure phase, a $Ce_2Ni_7$ type crystal-structure phase and a $Gd_2Co_7$ type crystal-structure phase, and at least one phase selected from the second group consisting of a CrB type crystal structure phase, a FeB type crystal structure phase, an $AlB_2$ type crystal-structure phase, a $CeCu_2$ type crystal-structure phase, a $Ni_2In$ type crystal-structure phase, a $CaIn_2$ type crystal-structure phase, a $Fe_2P$ type crystal-structure phase and a $ThSi_2$ type crystal-structure phase; a ratio of a strongest peak Iy of said second group to a strongest peak Ix of said first group (Iy/Ix) in an X-ray diffraction by Cu-Kα ray being in a range of 0.01 to 10; and said hydrogen absorbing alloy being represented by the following formula (V):

$$R(Ni_{1-d}T_d)_z \quad (V)$$

wherein R is at least one element selected from the group consisting of rare earth elements, Y, Zr, Hf and Ti; T is at least one element selected from the group consisting of Co, Fe, Cu, Mn, Al, Si, B, Sn, Ga, Ge, Zn and Ag; and d and z are respectively a number satisfying conditions: $d \leq 0.9$, and $1.5 \leq z \leq 4$.

24. A hydrogen absorbing electrode containing a hydrogen absorbing alloy comprising $AB_3$ type crystal-structure phase and represented by the following formula (I):

$$R(Ni_{1-x}M_x)_z \quad (I)$$

wherein R is at least one element selected from rare earth elements (including Y); wherein M is at least one element selected from the group consisting of Al, Ga, Zn, Sn, Si, Ag, In, Ti, Zr, Hf, V, Nb, Ta, Mn, Mo and W; and wherein x and z are respectively a number satisfying conditions: $0.01 \leq x \leq 0.2$, and $2.5 < z < 3.25$.

25. A metal oxide-hydrogen secondary battery comprising a positive electrode containing a metal oxide, a negative electrode and an alkali electrolyte; said negative electrode contains a hydrogen absorbing alloy comprising $AB_3$ type crystal-structure phase and represented by the following formula (I):

$$R(Ni_{1-x}M_x)_z \quad (I)$$

wherein R is at least one element selected from rare earth elements (including Y); wherein M is at least one element selected from the group consisting of Al, Ga, Zn, Sn, Si, Ag, In, Ti, Zr, Hf, V, Nb, Ta, Mn, Mo and W; and wherein x and z are respectively a number satisfying conditions: $0.01 \leq x \leq 0.2$, and $2.5 < z < 3.25$.

* * * * *